March 28, 1961 G. O. PHILIP 2,976,894
WIRE STRINGING MACHINE
Filed Dec. 31, 1958 14 Sheets-Sheet 1

INVENTOR
GEORGE O. PHILIP
BY John A. Hall
ATTORNEY

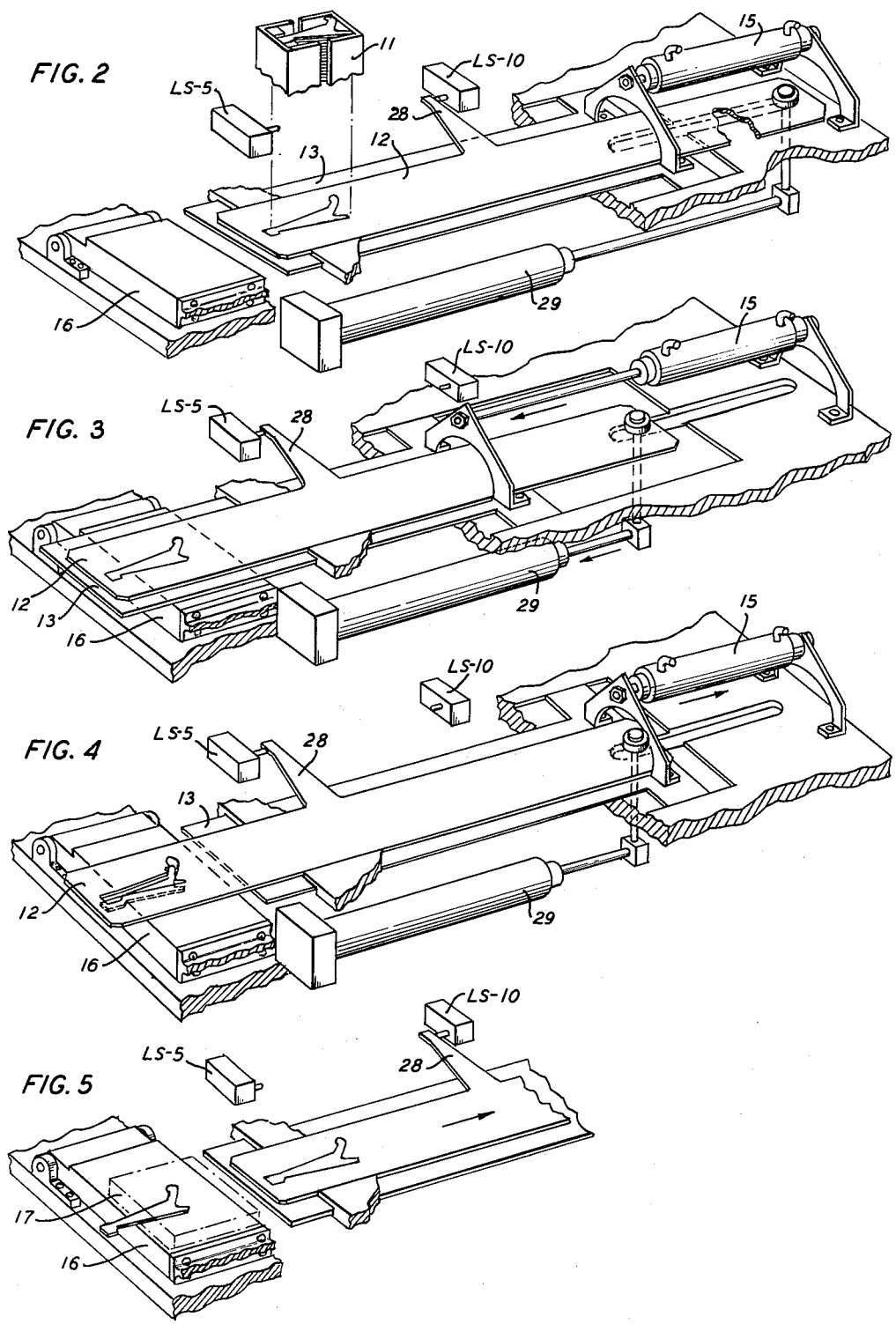

March 28, 1961  G. O. PHILIP  2,976,894
WIRE STRINGING MACHINE
Filed Dec. 31, 1958  14 Sheets-Sheet 3
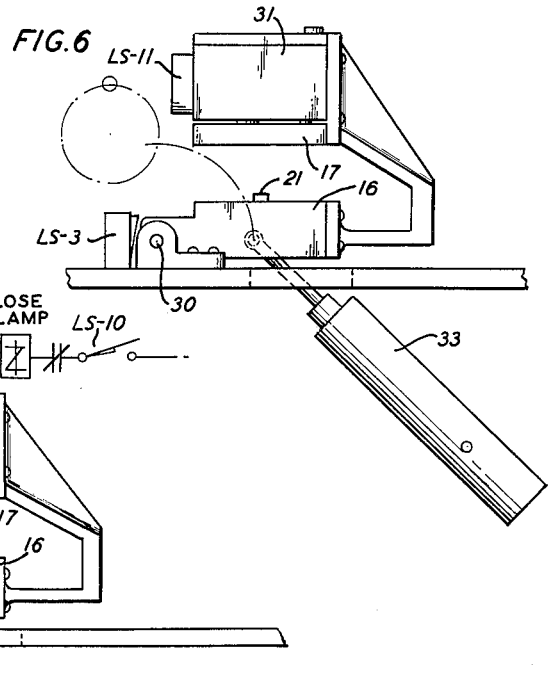
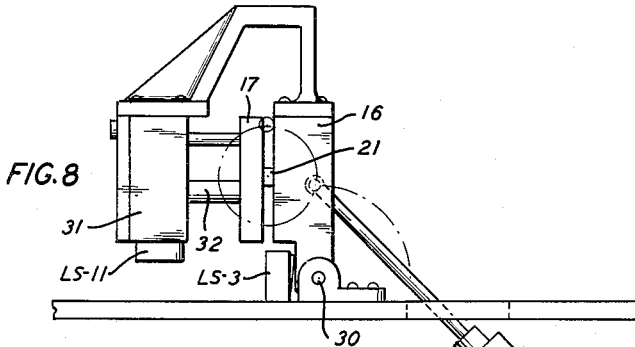
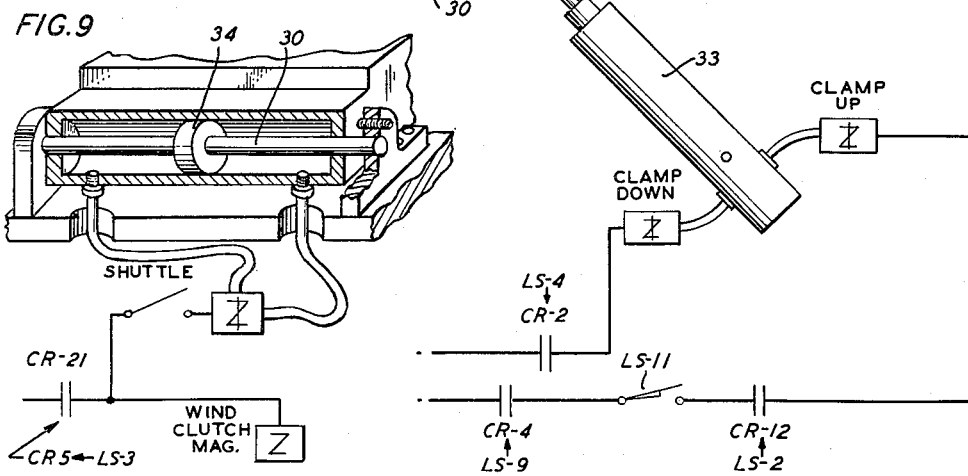

March 28, 1961 G. O. PHILIP 2,976,894
WIRE STRINGING MACHINE
Filed Dec. 31, 1958 14 Sheets-Sheet 5

LEGEND

March 28, 1961  G. O. PHILIP  2,976,894
WIRE STRINGING MACHINE
Filed Dec. 31, 1958  14 Sheets-Sheet 7

March 28, 1961 G. O. PHILIP 2,976,894
WIRE STRINGING MACHINE
Filed Dec. 31, 1958 14 Sheets-Sheet 8
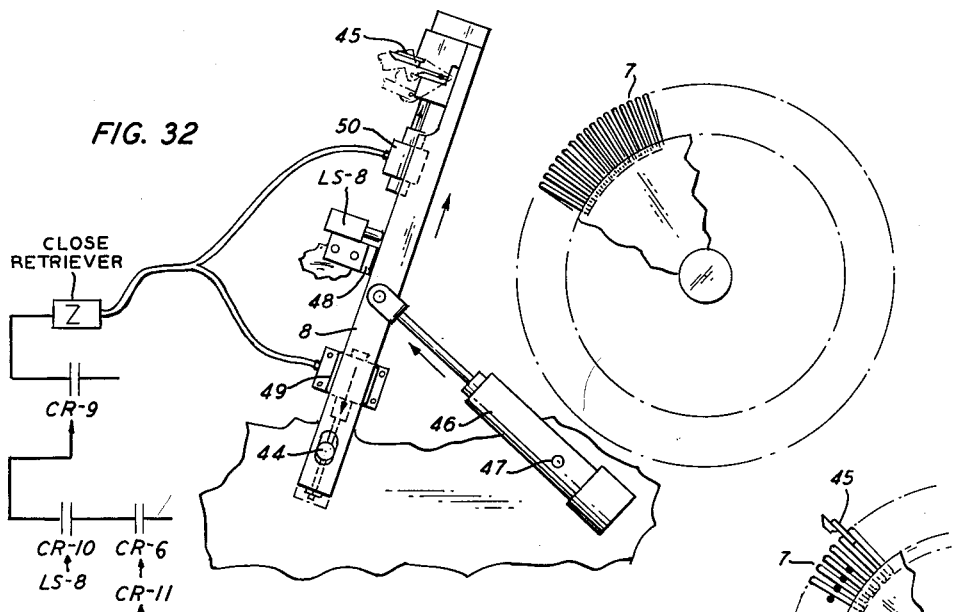
FIG. 32
FIG. 33
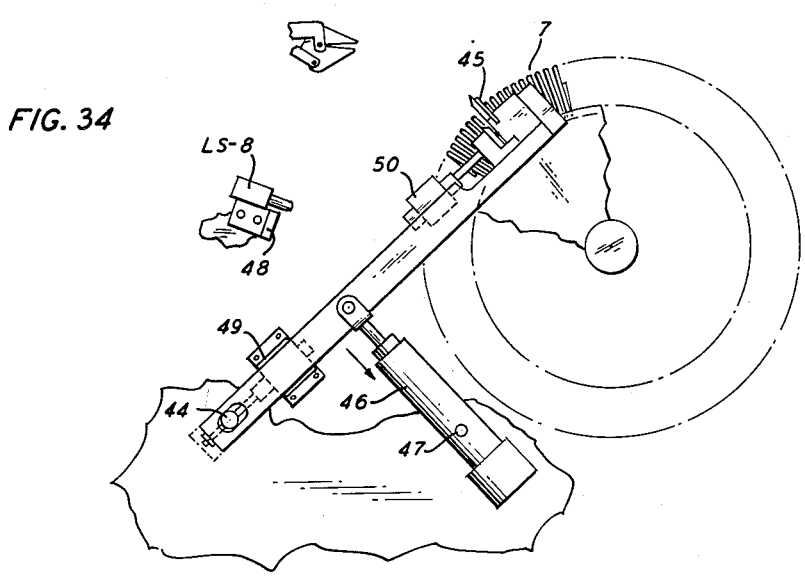
FIG. 34

March 28, 1961 G. O. PHILIP 2,976,894
WIRE STRINGING MACHINE
Filed Dec. 31, 1958 14 Sheets-Sheet 9

March 28, 1961  G. O. PHILIP  2,976,894
WIRE STRINGING MACHINE
Filed Dec. 31, 1958  14 Sheets-Sheet 14

United States Patent Office 2,976,894
Patented Mar. 28, 1961

2,976,894

WIRE STRINGING MACHINE

George O. Philip, Vestal, N.Y., assignor to International Business Machines Corporation, New York, N.Y., a corporation of New York Filed Dec. 31, 1958, Ser. No. 784,307

19 Claims. (Cl. 140—93)

This invention relates to automata and particularly to machines for assembling manufactured price parts into groups preparatory to further manufacturing operations, such as electroplating.

The object of the invention is to provide machine operated means for the purpose of handling a great number of small metallic parts preparatory to further manufacturing operations not only to relieve the tedium of manual handling but to speed the operations and thus promote economy in manufacture.

The invention is embodied in machine means consisting primarily of two parts, one a container and means for orienting a supply of piece parts and for moving them successively into cooperative relationship with a wire stringing means where an appropriate part of each is thrust into the field of an orbital winder and a second part consisting of an orbital winder whose nose, out of which a wire is fed, is moved in a circular path about the said appropriate part of the said piece part and a pair of grippers to pull the wire from the nose of the winder in a sort of hand over hand motion to provide another length of wire between each wrapping operation by the said orbital winder. The machine may be preset to perform any given number of cycles of operation each consisting of the stringing of a pair of piece parts, one under the grip of each of the two grippers in turn and to then operate another means to pull an extra length of wire from the nose of the winder, to snip it and then dispose of the string of piece parts by wedging this extra length into a device which will hold a large number of such strings of piece parts and which may then be removed from the machine and transported to another manufacturing device, such as a tank of electrolyte for a plating operation.

The various machine movements are produced by compressed air piston and cylinder devices and these in turn are controlled by solenoid operated air valves. Each machine movement is measured by a so-called limit switch which is a push button device arranged to be operated when the part to be controlled has reached a given position at which time the operation of the limit switch in closing or in opening a circuit will control relay means and which in turn will operate the much heavier duty solenoids.

An exception to this air forced movement is the orbital winder which is operated by a continuously operated motor. The control is still by way of a limit switch and a responsive relay and magnet, but in this case the magnet operates not to open or close an air valve but to trip a conventional single revolution mechanical clutch whereby the orbital winder is impelled to move its nose through its circular path in a single operation. Where a double wrap is to be made, then the trip magnet is held in operation beyond the time taken for a single wrap.

A feature of the invention is the arrangement whereby a plurality of part feeders of differing design to feed different types of piece parts may be mounted along a runway so that the stringing head may be moved into cooperative relationship with each. By this arrangement the stringing head may be kept in continuous employment and lost time in making alternative clamping adjustment to accommodate various shaped piece parts avoided. It will be realized that some piece parts may be stacked in such a manner that after one part has been strung the next may be moved into position by a simple movement of translation of the part at the bottom of the stack whereas others are of such shape and size that stacking is impracticable and these may be arranged to slide down a chute, being urged to the top of the chute by magnetic vibration. No change in the stringing head need by made except to adjust its position along the runway into cooperative relationship with another part feeder.

It will be realized that some piece parts are shaped so that a simple single turn of wire will be sufficient to hold the piece part in a string without loss during the ensuing mechanical, chemical, or other manufacturing operations while others may require a firmer grip by the wire such as may be obtained by a double wrap of wire or in extreme cases by an interlocked double wrap. Accordingly a feature of the invention is a means for adjusting the said stringing head to perform a single wrap, a double wrap or an interlocked double wrap.

Mounted as a part of the stringing head is a switchboard having mounted thereon an array of switches such as simple push button circuit closers, on and off switches and selectors, by which the pattern of operation may be preselected and by which various movements of the components may be tested. Through this switchboard, the stringing head may be prearranged to make a single wrap, a double wrap, or an interlocked double wrap about the given part of the piece part and the number of cycles to be performed may likewise be determined. Through a simple plug and jack arrangement the few controls for the part feeders, such as the slide movers for forwarding the next piece part to the clamp associated with and acting as a part of the stringing head may be connected in to the switchboard so that by such control the automaton including a given part feeder is conditioned to operate to produce a plurality of strings of parts, a stop to its operation only being brought about through exhaustion of the supply of piece parts or the complete filling of the string holder.

Another feature is a device, hereinafter termed a retriever, which operates as a last act in the stringing cycle. This is in the form of an arm, which after the last part of a string is strung rotates to a point where the stringing wire may be gripped and then snipped and which then rotates back to its normal position where it wedges the snipped string of parts in between two coils of a circular helix acting as a storage reel. When the retriever moves forward to grip and snip the string of parts, the gripping and snipping operation is accompanied by a lengthening operation whereby the retriever is effectively lengthened by an amount equal to the pitch of said circular helix whereby the retrieved string is wedged into said helix one step beyond the last retrieved string and thereupon the said retriever is effectively shortened to rotate the said storage reel by an amount equal to the pitch of said helix. Thus the retriever picks up a completed string of parts and stores it in a storage reel. The said storage reel is manually removable and replaceable so that in the operation of the machine, a long cycle will include not only the stringing of a plurality of parts but will also include the retrieval of a plurality of strings and the transportation thereof to a storage reel which may thereafter be removed from this machine and placed bodily into another machine for further processing, such as plating.

Also, in accordance with this feature the said storage reel is provided with means to automatically produce a signal when the reel has become completely filled and it is time for an attendant to remove this full reel and replace it in the machine by another empty reel. The reel being mounted for rotation has a camming surface provided thereon which may be sensed by a limit switch and this switch, upon operating, signals the end of a cycle of operations.

Other features will appear hereinafter.

The drawings consist of fourteen sheets having forty-five figures, as follows:

Fig. 2 is a skeletonized perspective view of the feeder used with a magazine type feeder, shown in the normal position indicated in Fig. 1 wherein the two plates are in a position to receive a piece part from the magazine;

Fig. 3 is a similar view showing the two plates extended into the jaws of the clamp;

Fig. 4 is a similar view showing the retraction of the lower plate to allow the piece part held in the recess of the upper plate to drop on to the face of the clamp;

Fig. 5 is a similar but fragmentary view showing both plates retracted to the position of Fig. 2 and the piece part left by them now being gripped by the downward movement of the upper jaw of the clamp;

Fig. 6 is a side view of the clamp in its normal position showing also the pneumatic cylinder used to move it from its normal to its "UP" position;

Fig. 7 is a similar side view of the clamp in its closed position, where the upper jaw has been moved downwardly to grasp a piece part deposited on the lower jaw thereof;

Fig. 8 is a similar side view of the clamp in its "UP" position;

Figure 1:
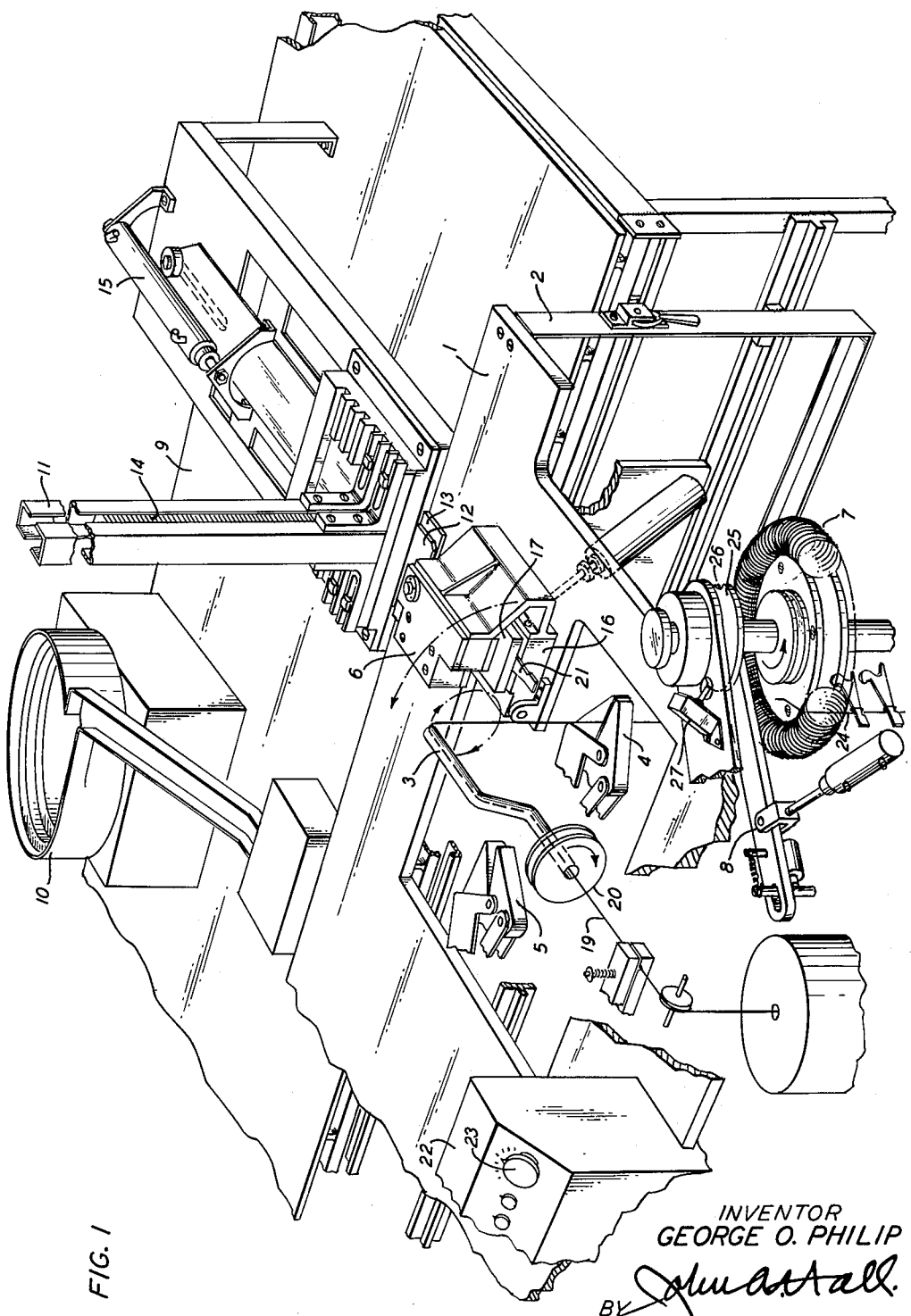
Fig. 1 is a skeletonized perspective view of the stringing device, drawn particularly to show the cooperative relationship between the necessary components thereof.
Figure 10:
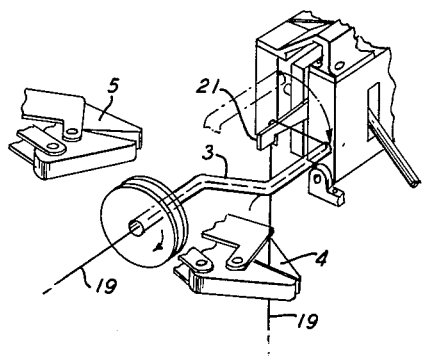
Figure 11:
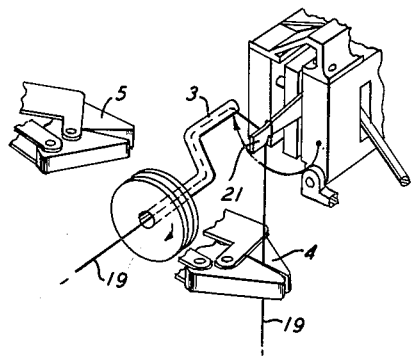
Figure 12:
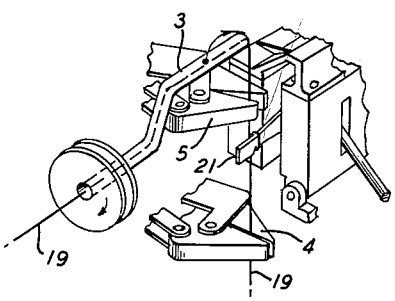
Figure 13:
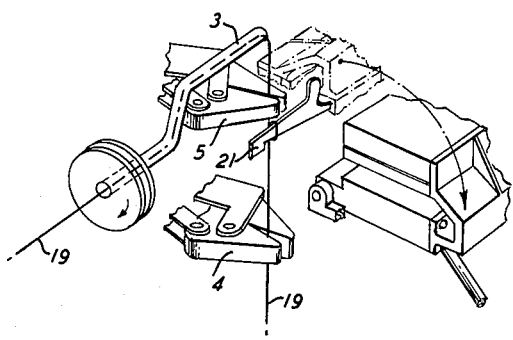
Figure 14:
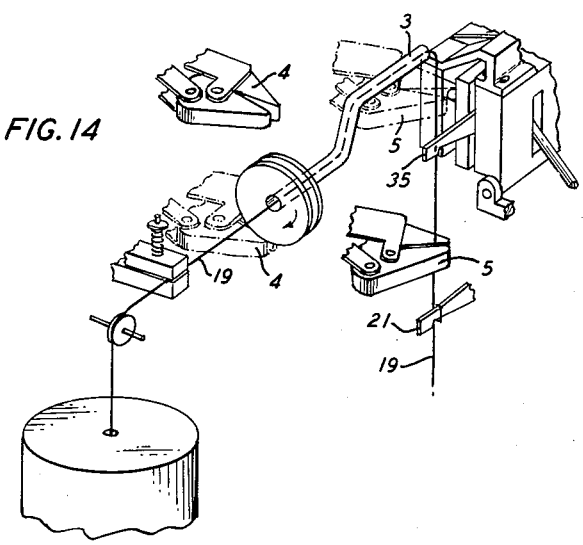
Figure 15:
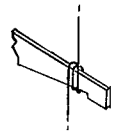
Figure 16:
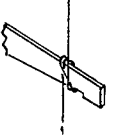
Figure 17:
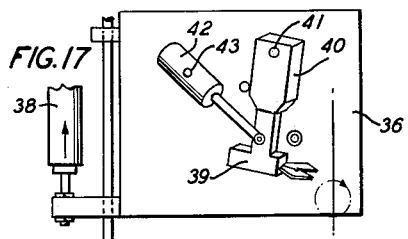
Figure 18:
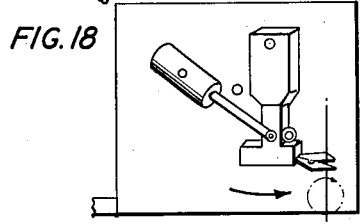
Figure 19:
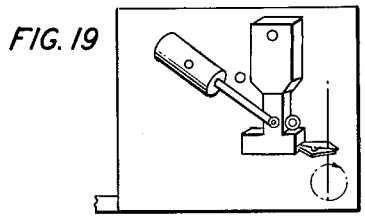
Figure 20:
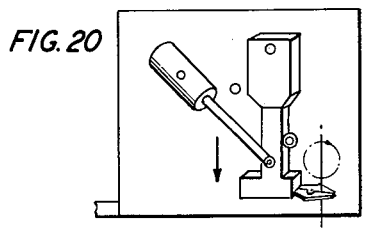
Figure 21:
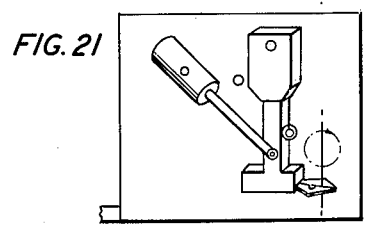
Figure 22:
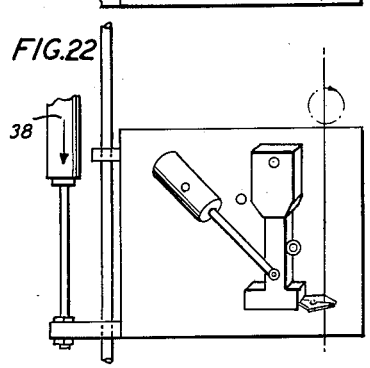
Figure 23:
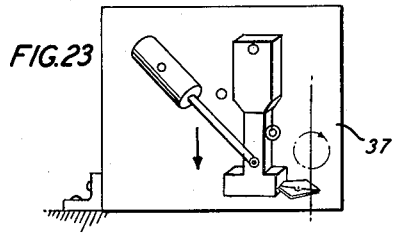
Figure 24:
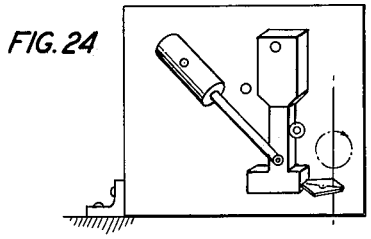
Figure 25:
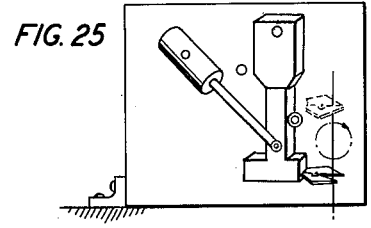
Figure 26:
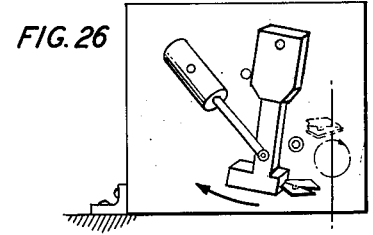
Figure 27:
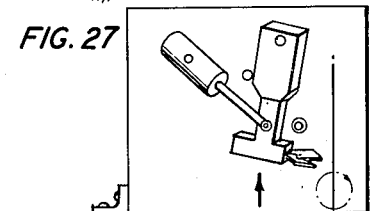
Figure 28:
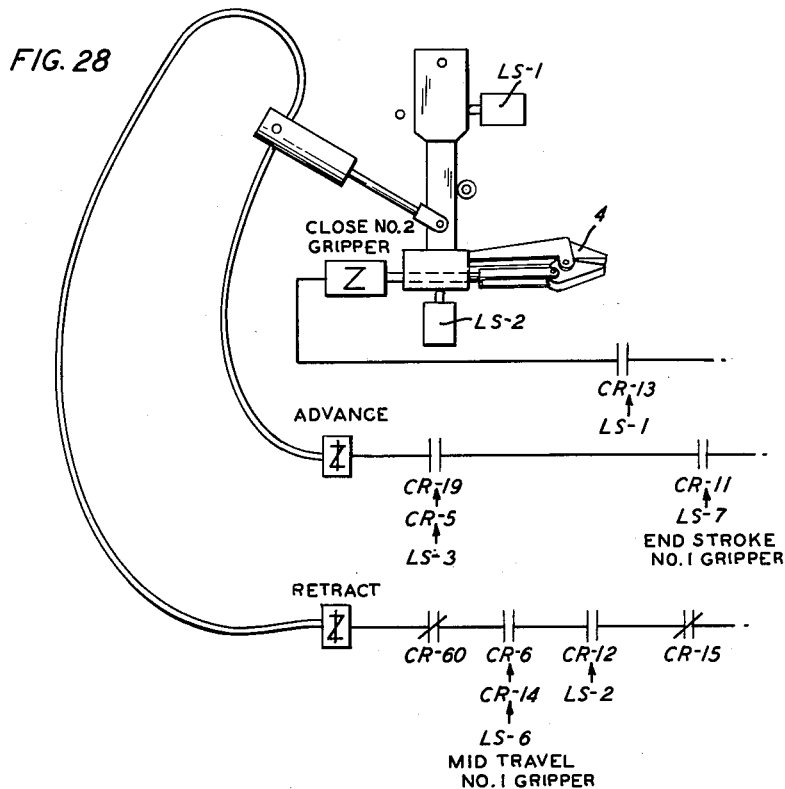
Figure 35:
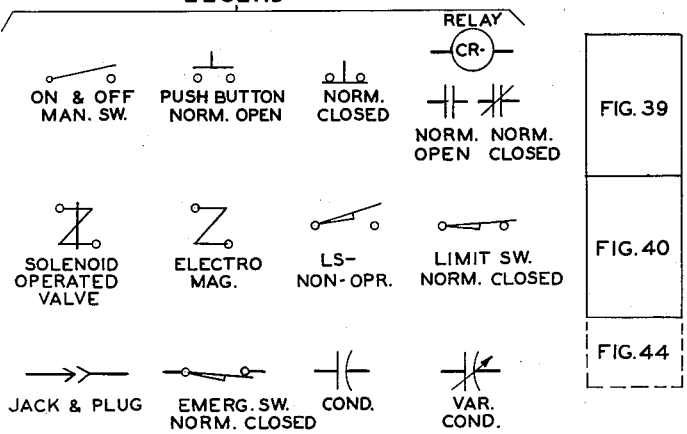
Figures 36, 37, 38:
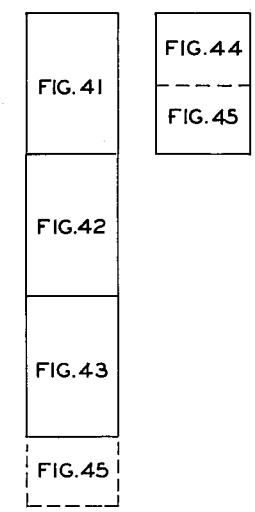
Figure 29:
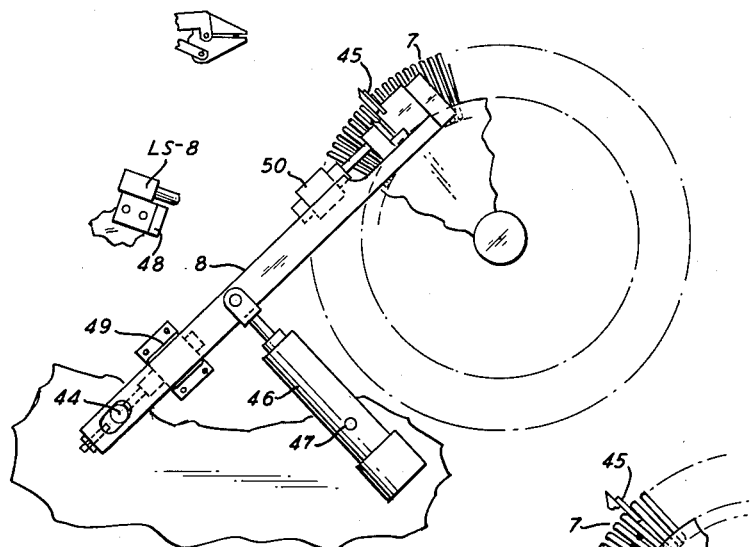
Figure 30:
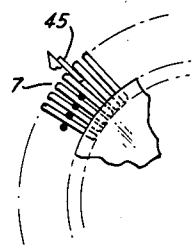
Figure 31:
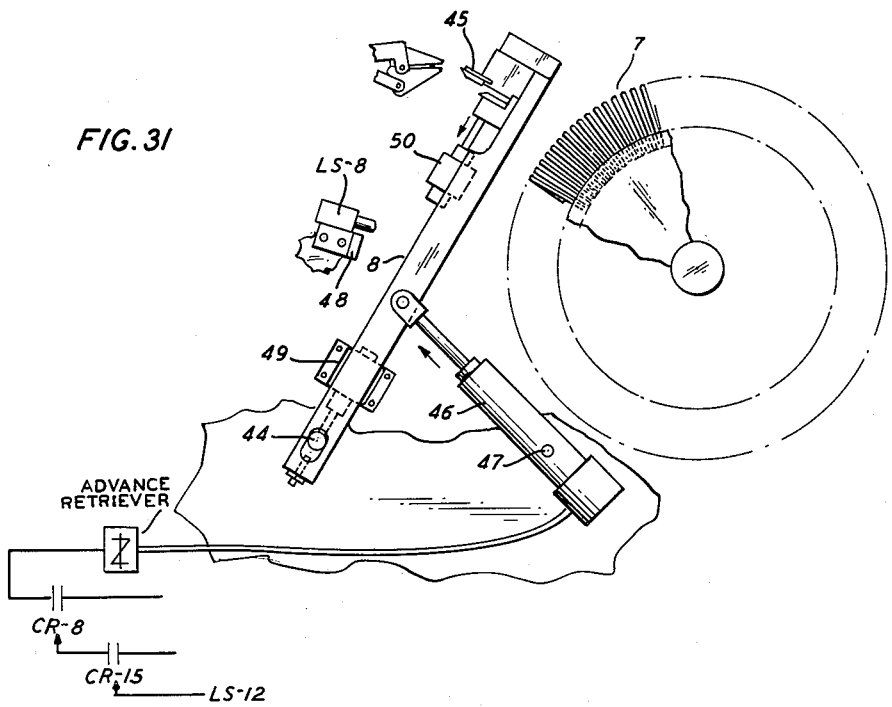
Figure 39:
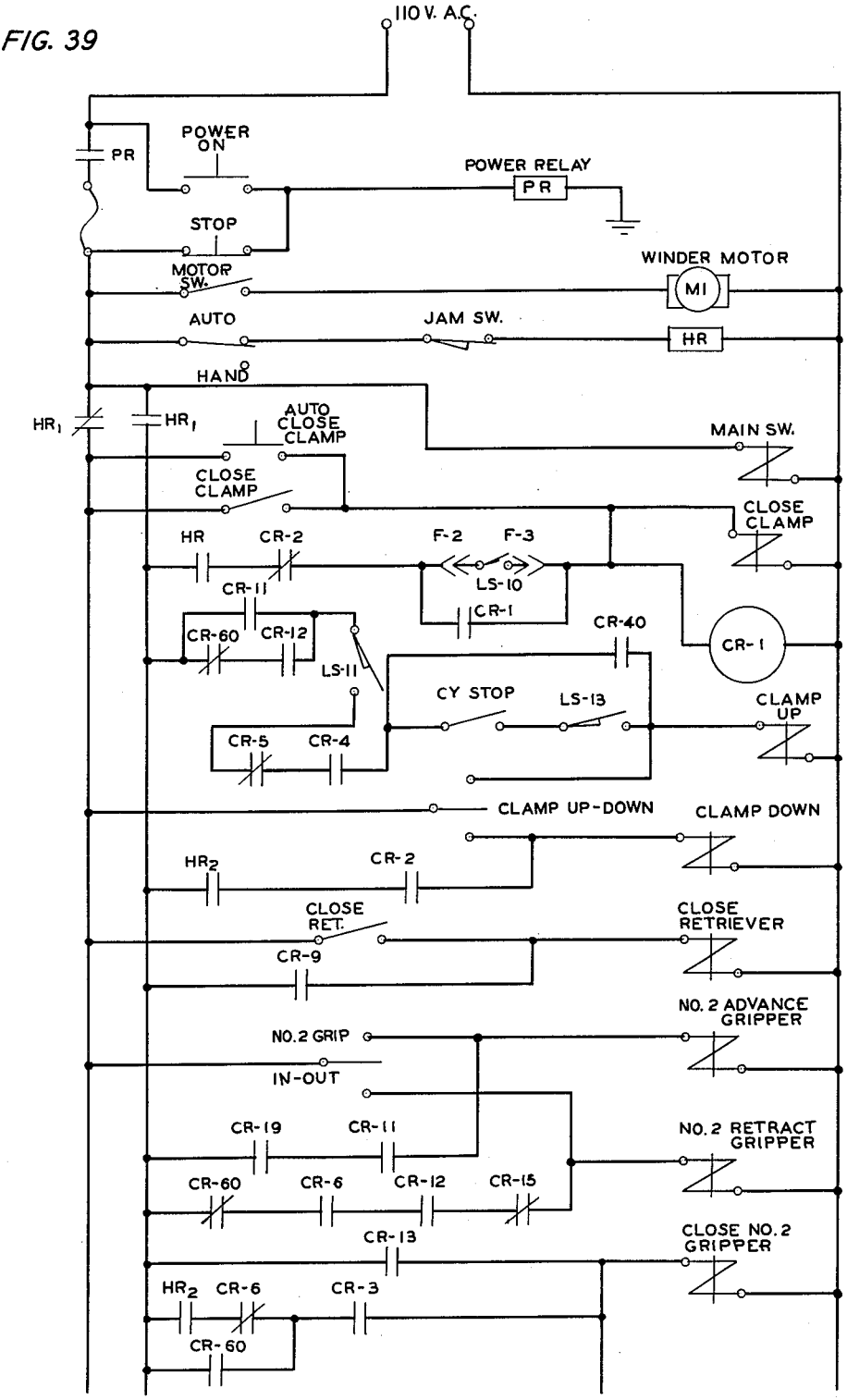
Figure 40:
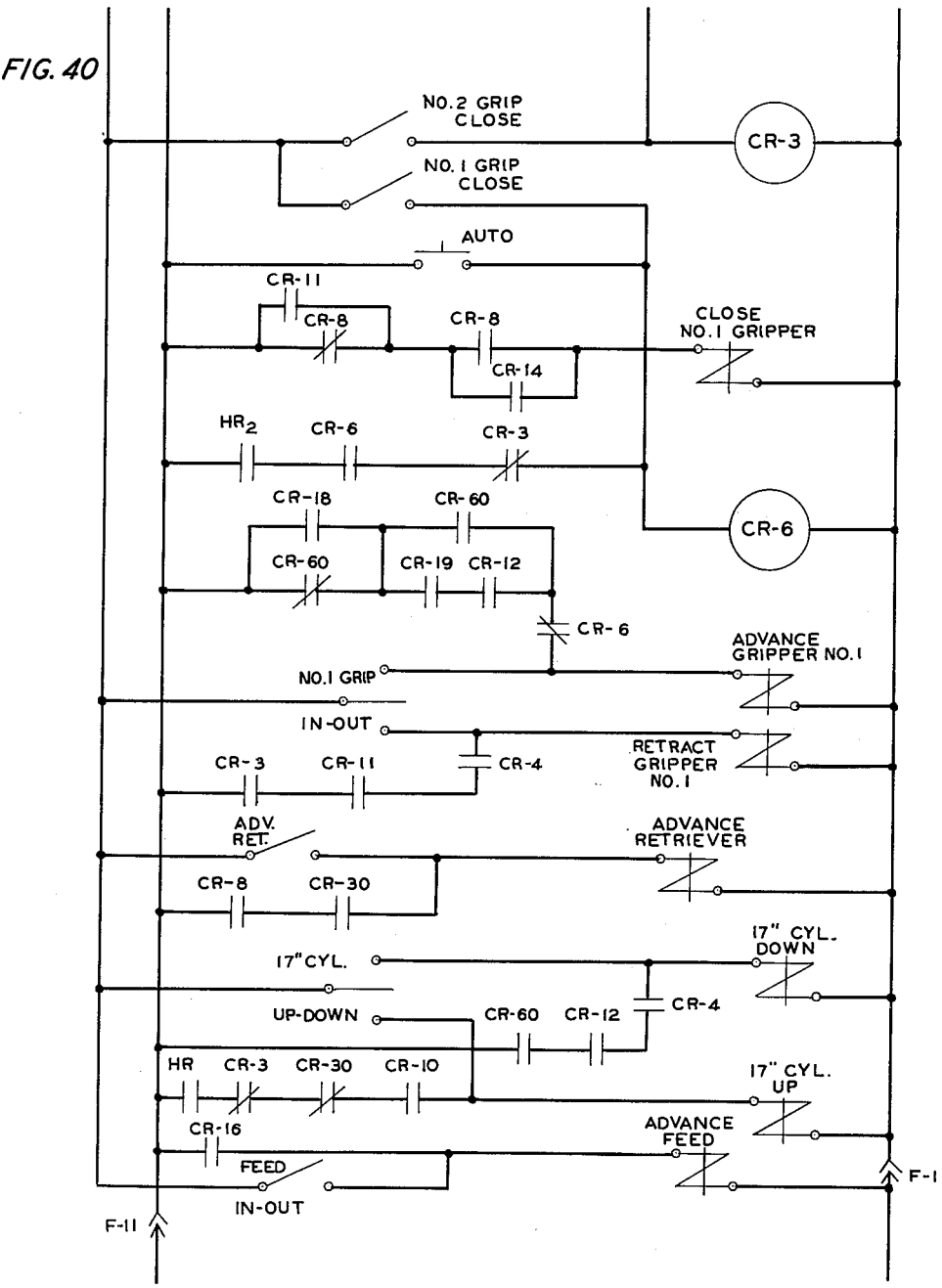
Figure 41:
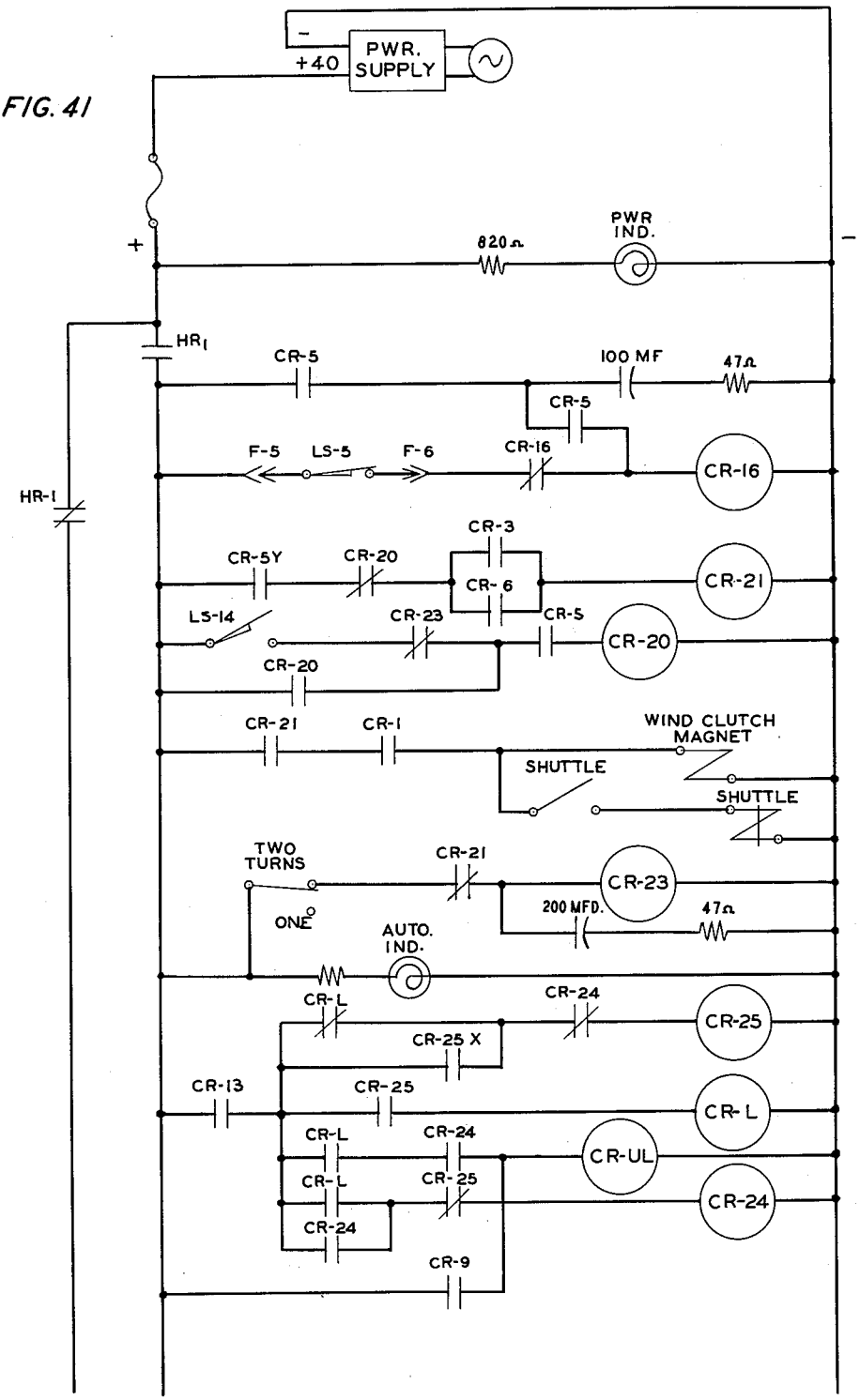
Figure 42:
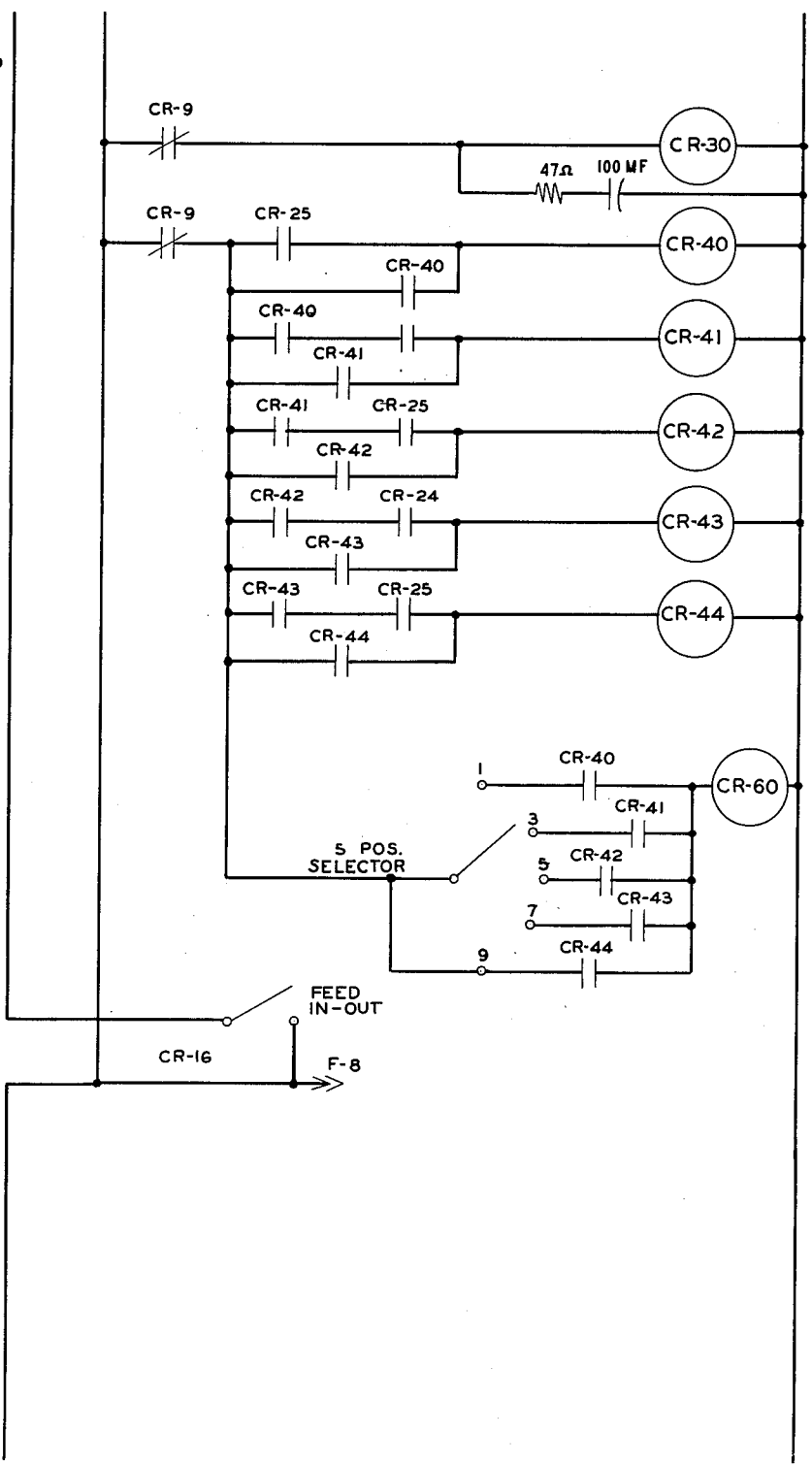
Figure 43:
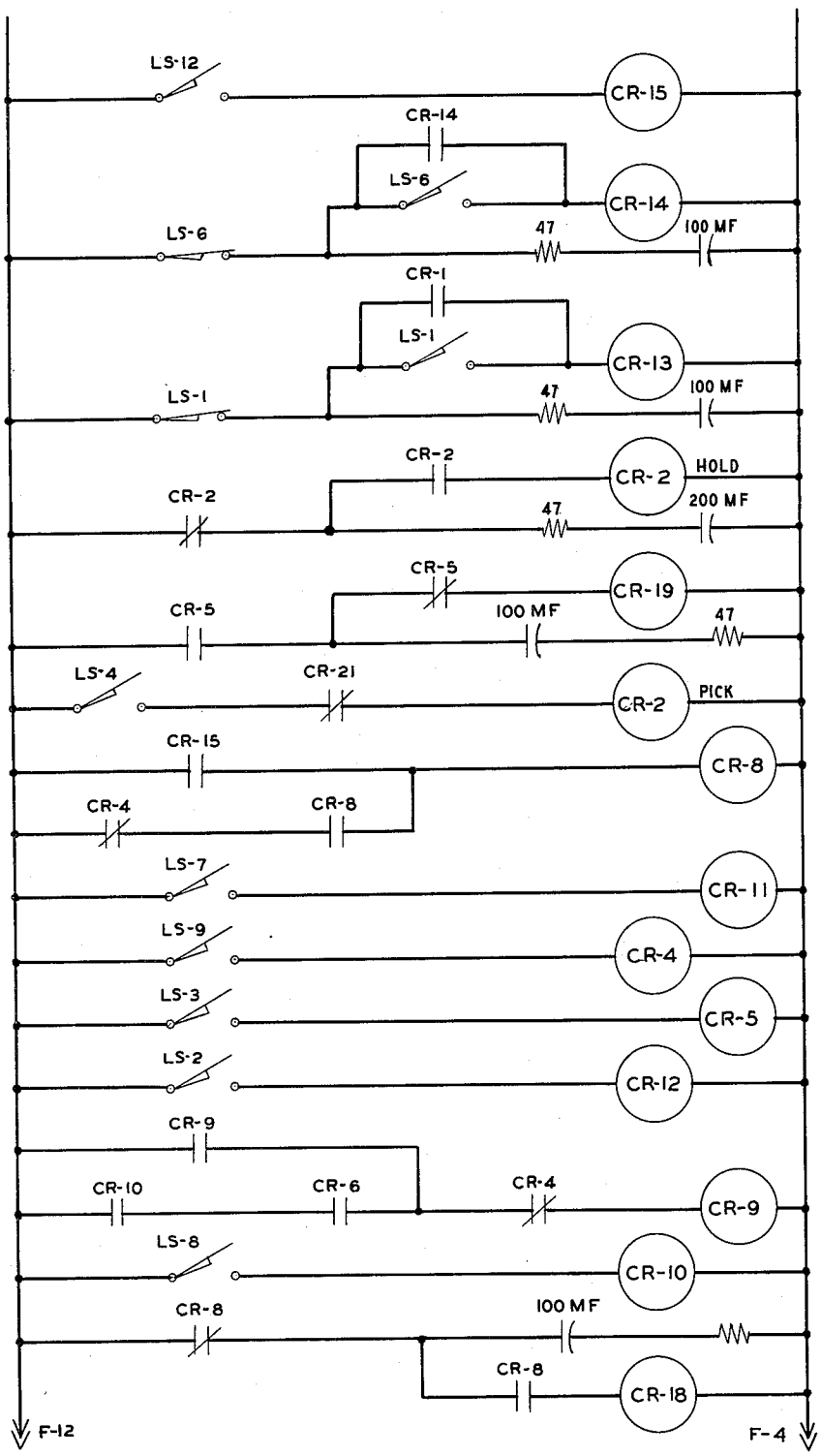
Figure 44:
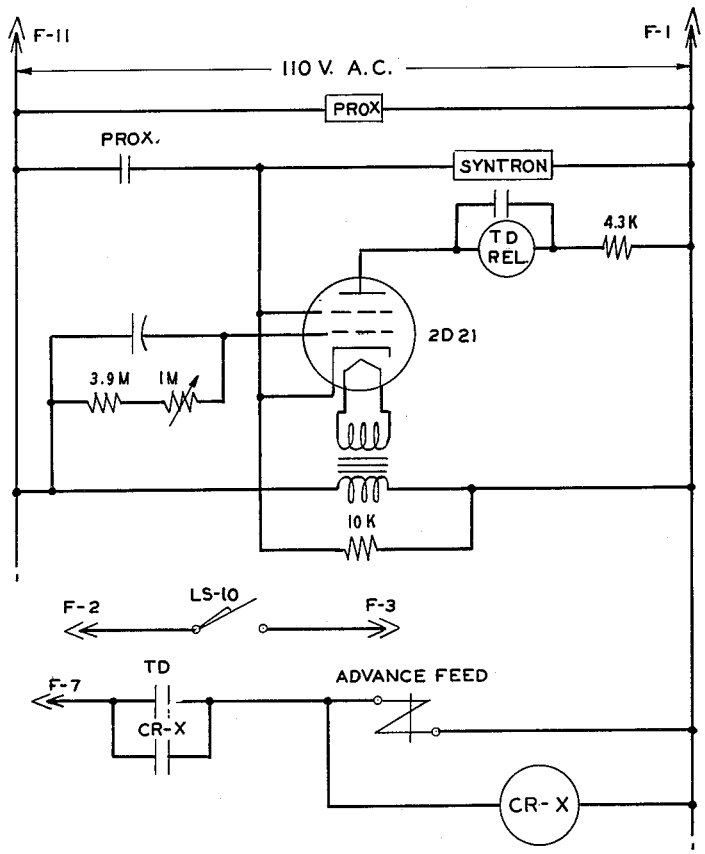
Figure 45:
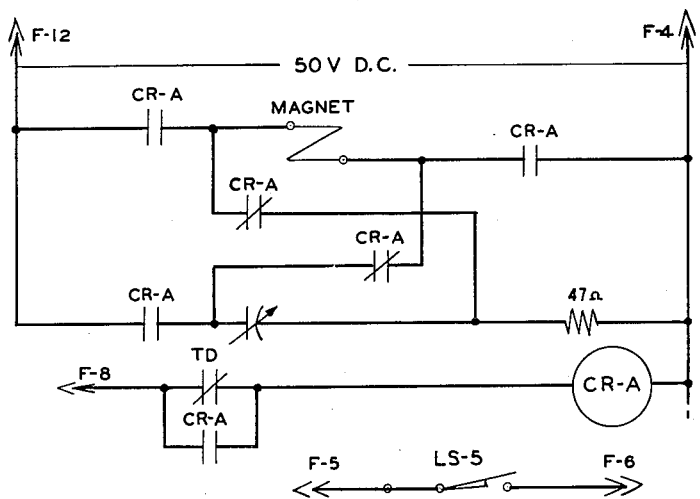

Fig. 9 is a detail view, partly in section showing how the pivot rod on which the clamp rotates from its "DOWN" to its "UP" position also plays the part of a piston rod whereby the clamp as a whole may be given a movement to and from the plane of the orbit of the nose of the winder during the operation of said orbital winder to produce an overlapping wind when two or more turns are produced by the said winder;

Fig. 10 is a skeletonized perspective view showing the cooperative relationship between the clamp, the piece part held thereby, the two grippers and the orbital winder in motion at the stage where the orbital winder has made about a quarter of a revolution;

Fig. 11 is a similar view showing the wrapping of the wire about the end of the piece part when the orbital winder has made about three quarters of a revolution;

Fig. 12 is a similar view showing the stage where the revolution of the orbital winder has been completed, where the number 2 gripper has not yet released its grip on the wire and where the number 1 gripper is moving in above the strung piece part and is about to grip the wire, and where the clamp has freed the piece part;

Fig. 13 is a similar view showing where the wire has been gripped by the number 1 gripper which is about to move downwardly to place the wire alongside another piece part, where the number 2 gripper 4 has released its grip on the wire and is about to back out toward the left and then upwardly to its normal position and where the opened clamp has been rotated to its normal position to receive another piece part;

Fig. 14 is a similar view showing how number 1 gripper 5 has moved downwardly to stretch the wire from the nose of the orbital winder 3 and alongside another piece part 35 which the clamp has moved on to the axis of the orbital winder, and how the number 2 gripper has simultaneously moved upward to its normal position;

Fig. 15 is a fragmentary perspective sketch showing a double wrap about a piece part;

Fig. 16 is a similar fragmentary perspective sketch showing an interlocked double wrap about a piece part;

Figs. 17 to 22 inclusive are a series of schematic drawings showing different stages in the operation of gripper number 2 and Figs. 23 to 27 inclusive are corresponding stages in the operation of gripper number 1; as follows:

Fig. 17 shows gripper number 2 in its normal and unoperated position excepting that the 17″ cylinder has lifted the frame on which it is mounted to its top position in readiness for the hand over hand operation of the two grippers;

Fig. 18 shows gripper number 2 having been rotated toward the right where the gripper is about to be closed to grasp the stringing wire;

Fig. 19 shows gripper number 2 after it has been closed and now has a grasp on the wire;

Fig. 20 shows gripper number 2 in movement downwardly during which movement it draws out of the nose of the orbital winder a short distance equal to a position somewhat above the orbit of the winder to a corresponding position somewhat below the orbit of the winder;

Fig. 21 is the same as Fig. 20, but is shown here to indicate that no movement takes place while gripper number 1 (Fig. 27) is moving into its normal position;

Fig. 22 is the same as Fig. 21, except that a long downward movement of the frame has just taken place to draw an extra length of wire from the nose of the orbital winder ready for the operation of the retriever;

Fig. 23 is a similar view of gripper number 1, as it is making its downward movement to pull a short length of stringing wire from the nose of the orbital winder and corresponds exactly to such a movement on the part of gripper number 2 shown in Fig. 20;

Fig. 24 is a similar view of gripper number 1 at rest while gripper number 2 is moving toward the right ready to grasp the wire above the orbit of the wire as shown in Fig. 18;

Fig. 25 is a similar view showing gripper number 1 relaxing its grip on the wire while at the same time gripper number 2 is closing its grasp on the wire as indicated in Fig. 19;

Fig. 26 is a similar view showing gripper number 1 backing away from the wire toward the left while gripper number 2 is completing its downward stroke to pull out a short length of wire from the nose of the orbital winder to a position somewhat below the orbit of such winder as indicated in Fig. 20;

Fig. 27 is a similar view showing gripper number 1 completing its upward stroke to its normal position while gripper number 2 maintains its position as shown in Fig. 21;

Fig. 28 is a schematic outline showing and circuit diagram of number 2 gripper in its end stroke position with an indication of the circuitry for operating the solenoid actuated air valves which control its movements;

Figs. 29 to 34 inclusive are a series of schematic diagrams of the retriever and the elements with which it cooperates; and in which specifically Fig. 29 shows the retriever in its normal position and indicates the relative position of the stop and the limit switch which is operated to signal the furthest advance of the retriever and the relative position of the jaws of the number two gripper which is holding the stringing wire which is about to be gripped, snipped and transported to the storage reel;

Fig. 30 is a fragmentary view of a part of the storage reel to show the normal position of a blade provided on the retriever for the purpose of gripping the storage reel and for thereafter rotating the reel for the purpose of making ready to receive the succeeding string of parts;

Fig. 31 is a similar schematic view of the retriever in its advance movement and before it has reached the wire held by number 2 gripper and before it has reached the stop and the limit switch located alongside the stop;

Fig. 32 is a similar view of the retriever after it has reached the limit of its advance movement and has operated the limit switch thereat, which limit switch has operated circuits to cause the simultaneous pneumatic operation of a pair of air cylinders mounted on the retriever arm, one of which closes the jaws of the gripper and operates the shearing blade of the wire snipper and the other of which thrusts against the pivot of the retriever to effectively lengthen the retriever arm by an amount equal to the pitch of the coils of the storage reel so that the wire on which the parts are strung will be wedged in between the next pair of coils beyond those where the last wire was left;

Fig. 33 is a fragmentary showing of a portion of the storage reel similar to Fig. 30 shown to indicate the point where the effectively lengthened retriever arm storage coil rotating blade will enter the storage reel when the retriever leaves the position indicated by Fig. 32 and reaches the position indicated by Fig. 34;

Fig. 34 is a similar view showing the retracted position of the retriever arm but before it has been released from its virtually lengthened condition and before the string of parts just transported to and wedged in between two turns of the storage reel has been released;

Fig. 35 marked "LEGEND" is a group of symbols used in the wiring diagram Figs. 39 to 45 inclusive and which through the labels used is believed to be self explanatory;

Fig. 36 is a block diagram showing how Figs. 39, 40 and 44 may be placed to form that part of the wiring diagram wherein the elements are powered by standard 110 volt alternating current and in which Figs. 39 and 40 indicate the arrangement when the stringing device is cooperatively associated with the magazine type feeder as indicated in Fig. 1 and further in which Fig. 44 is added when the device is moved to cooperative relationship with another type feeder such as a magnetic vibratory parts feeder also as indicated in Fig. 1;

Fig. 37 is a similar block diagram showing how Figs. 41, 42 and 43 may be placed to provide a wiring diagram in which the elements are powered by direct current when the stringing machine is cooperatively associated with a magazine parts feeder as indicated in Fig. 1 and how, alternatively, Figs. 41, 42, 43 and 45 may be placed to provide a wiring diagram when the stringing machine is cooperatively associated with a magnetic vibratory parts feeder as also indicated in Fig. 1;

Fig. 38 is a block diagram used to indicate the relative location of these Figs. 44 and 45 on a single sheet;

Figs. 39 and 40 are each part of a circuit diagram for the control of certain of the elements of the present invention by means of alternating current power;

Figs. 41, 42 and 43 are each part of a circuit diagram for additional control of certain of the elements of the present invention by means of direct current power;

Fig. 44 is a circuit diagram for the control individual to a vibratory parts feeder when connected in to the alternating current network of Figs. 39 and 40; and Fig. 45 is a circuit diagram for further control of the said vibratory parts feeder when connected in to the direct current network of Figs. 41, 42 and 43.

In Fig. 1 the stringing machine consists of a table 1 and frame 2 on which the various components such as the orbital winder 3, the two grippers 4 and 5, the clamp 6, the storage reel 7 and the retriever 8 are mounted and a bench top 9 on which a row of parts feeders, such as the vibratory parts feeder 10 and the magazine feeder 11, are mounted. The table 1 is movable with respect to the bench top 9 so that the wire stringing device may be moved alternatively into cooperative relationship with any one of a number of parts feeders. In Fig. 1 the machine is shown as being in cooperative relationship with the magazine feeder 11 in which a plurality of parts are indicated as stacked.

In the operation of the device a feeder consisting of a pair of plates 12 and 13 normally moves to a position in which a cut out portion of the plate 12 exactly corresponding to the particular shaped piece part to be strung is positioned directly below the stack of piece parts 14 so that the bottom one falls onto the lower plate 13. Thereupon both plates simultaneously are impelled forward pneumatically by the cylinder 15 and another cylinder (not shown) until the forward ends of these plates 12 and 13 are positioned within the opened jaws of the clamp 6. Thereupon the lower plate 13 is retracted to drop the piece part on the lower jaw 16 of the clamp, this being followed by the retraction of the upper plate 12. The upper jaw 17 of the clamp 6 is then brought down to grasp the piece part and the clamp is then rotated 90° by the air cylinder 18 so as to place a portion of the piece part squarely on the axis of the orbital winder 3 and alongside the wire 19 now stretched between the number 2 gripper and the nose of the orbital winder whose orbit is indicated by the dot and dash circle.

The orbital winder, shown here only as a pipe mounted on a pulley 20 and bent so that on a revolution of the pulley the nose thereof will move in a circular orbit, is driven by a conventional single revolution device. There is a latch operated by an electromagnet which when operated will clutch the device to a motor associated with the pulley 20 by a belt and which will cause the winder to operate through a single revolution at a time (unless the electromagnet is held operated at the completion of this single revolution). This causes the wire 19 to be wound about the end of the piece part 21. When this wrap is completed, the number 1 gripper 5 moves toward the wire 19 just beneath the nose of the orbital winder and above the strung piece part and the upper plate 17 of the clamp releases its grip. Thereupon the jaws of the gripper 5 are closed and the jaws of the gripper 4 are opened. The number 2 gripper then moves away from the wire and then upwardly to a position close to and alongside the position in which the number 1 gripper 5 is shown while at the same time the number 1 gripper 5 moves downwardly to substantially the position in which the number 2 gripper 4 is shown, thus pulling a short length of wire 19 from the nose of the orbital winder ready for the next winding operation. In the meantime the clamp has been rotated back to the position in which it is shown and another piece part is inserted between the jaws thereof and returned to the winding position as above described.

Thus the two grippers alternate in a hand over hand manner as a plurality of piece parts are strung on the wire 19.

At the left hand of this figure a control panel 22 is schematically indicated on which a plurality of on and off and pushbutton switches are mounted and which may be operated in the manner and for the purposes to be described hereinafter in connection with the wiring diagram.

Among the switches mounted on the control panel 22 is a selector switch 23 which may be set at odd numbers up to and including 9 and this, as will be explained hereinafter, will control the number of pieces to be strung on each wire. When this predetermined number of parts has been strung, the base plate, on which the number 2 gripper 4 is mounted, is lowered about 17 inches with number 2 gripper grasping the wire 19 whereby an extra length of wire is drawn from the nose of the orbital winder. Thereupon the retriever 8 is moved in a counter clockwise direction to encompass the wire 19 in its jaws and to snip the wire just below the number 2 gripper in its said lowered position. The retriever then swings back and wedges the string of piece parts in between two coils of the helix 7 as indicated by the single string 24 dangling therefrom (for clarity only a single string is shown). In a manner to be described hereinafter, the end of the retriever 8 engages the helix 7 and, as a last act in each excursion, rotates the helix one step equal to the pitch thereof in a counter clockwise direction. Attached to and serving as a part of the mounting for the helix 7 is a cam 25 having an indented surface 26 so that the stem of the limit switch (LS-13) will be operated when the storage coil has been rotated to a point where the coil is full. This, as will be explained hereinafter, signals the end of a complete cycle of operations in which the stringing of a plurality of strings of piece parts has been accomplished. This signal will shut down the operation of the device until an attendant may detach the filled reel and replace it by an empty one and thereafter restart the machine.

The movements of the feeder

Figs. 2, 3, 4 and 5 are a series of views showing the successive stages in the operation of the feeder. For the purpose of clarity in description the upper plate has been shown with an arm 28 used to operate the limit switches LS-5 at the forward end of its travel and LS-10 at the backward end of its travel or, in other words, in its normal position. The two plates are moved by a short cylinder 15 for the lower plate 13 and a longer cylinder 29 for the upper plate 12. Both of these pneumatic cylinders are fed from the same solenoid operated valve and both move their plates together on the forward movement so that where the piece part is moved into the clamp they both move simultaneously. However, the relief valves of the two cylinders are adjusted differently so that when the retraction is to be made, the short cylinder 15 can bleed much faster than the long cylinder, with the result that the lower plate 13 moves backwardly immediately so as to allow the piece part to drop on the lower jaw 16 of the clamp before the upper plate 12 starts its return movement.

As for the limit switches LS-5 and LS-10, it will appear hereinafter in the description of the circuitry that LS-5 is normally closed whereby, when the circuit for controlling the admission of air to the cylinders 15 and 29 is closed, it will remain closed until the limit of the forward movement of the feeder is reached. The LS-10 switch is used to operate the circuit to close the clamp so that after the piece part is deposited, the closure of the upper jaw 17 of the clamp cannot take place prematurely but must wait until the feeder has been entirely withdrawn.

Operation of the clamp

The clamp is shown schematically, in Figs. 6 to 9 inclusive, for the purpose of making the operation thereof clear. In Fig. 6 the clamp is shown in its normal down and open position. The device has been rotated on its pivot pin 30 and the upper jaw 17 has been opened as far as possible. The upper part of the body 31 houses a pneumatic cylinder which will exert pressure on a piston and a piston rod 32 to move the upper jaw 17 toward the lower jaw 16 of the clamp. In each of the three Figs. 6, 7 and 8, a dot and dash circle is shown to indicate the orbit of the winder so it will be seen that the faces of these two clamp jaws are at some distance therefrom. In the operation of the device, and as will be more fully described hereinafter, after the piece part 21 has been deposited on the lower jaw 16 of the clamp and the feeder has been completely retracted, the limit switch LS-10 is operated and this, as indicated in Fig. 7, will energize the close clamp solenoid whereby the cylinder within the body 31 will be operated and the movement of the piston and the piston rod 32 will close the upper jaw 17 on to the piece part 21. A limit switch LS-11 is mounted on the body 31 in such manner that it will respond to the movement of the piston on the piston rod 32 and by its operation will produce a signal indicating that the clamp has been closed.

In accordance with the circuitry indicated in Fig. 8, the operation of the limit switch LS-11 will trigger the operation of the "CLAMP UP" solenoid, whereupon the operation of the pneumatic cylinder 33 will cause a 90° rotation of the clamp to bring the piece part 21 directly on the axis of the orbital winder, as indicated in Fig. 8.

In each of Figs. 6, 7 and 8 a limit switch LS-3 is shown as mounted in such a manner that when the clamp is down (Figs. 6 and 7) this switch will not be operated but will respond (as in Fig. 8) to produce a signal indicating that the clamp is up. It will appear hereinafter that the operation of LS-3 will cause the operation of the wind clutch magnet which will release the orbital winder and, under other conditions established in the manner hereinafter described, will also operate the shuttle solenoid so as to move the clamp as a whole sidewise, as indicated in Fig. 9. Here is shown schematically how the lower end of the lower jaw 16 is formed into a pneumatic cylinder in which the pivot pin 30 has mounted thereon a piston 34. When, as indicated, the LS-3 switch operates, it will not only cause the operation of the wind clutch magnet but will also energize the shuttle solenoid so that compressed air will be admitted to the cylinder holding the piston 34 as a result of which the clamp will move bodily to the right, as indicated in Fig. 9, so that a double wrap of the wire about the piece part 21 will be interlocked.

Operation of the orbital winder

The operation of the orbital winder is shown in a series of sketches, Figs. 10 to 16 inclusive. Fig. 10 shows the orbital winder in motion and after it has made about one quarter of a revolution. The number 2 gripper 4 has a grip on the wire 19 below the piece part 21 and the nose of the orbital winder 3 is revolving about such piece part 21 to wrap the wire thereabout. Fig. 11 shows the orbital winder after having advanced about three quarters of a revolution. Fig. 12 shows the state where the orbital winder has made a full revolution and the number 1 gripper 5 is moving in to grip the wire above the strung piece part, where the number 2 gripper 4 has not yet relinquished its grip on the wire and where the clamp has opened so that the immediately following movement of the clamp down to its normal position to receive another piece part may be unhindered. Fig. 13 shows that number 1 gripper 5 has firmly gripped the wire and that number 2 gripper has loosened its grip and is about to back out so that the number 1 gripper may move downwardly thus drawing more wire from the nose of the orbital winder. Fig. 14 shows the stage wherein the number 1 gripper has moved downwardly from its dotted position and number 2 gripper has moved upwardly to its normal position ready for the orbital winder to make a wrap about the next piece part 35.

Figs. 15 and 16 need no other explanation than that Fig. 15 shows a double wrap and Fig. 16 shows an overlapping or interlocked double wrap.

Hand over hand operation of grippers

Figs. 17 to 27 inclusive illustrate the hand over hand operation of the two grippers. Each gripper is mounted on a base plate such as the plate 36 for number 2 gripper and plate 37 for number 1 gripper. For the purposes of moving a string of parts at the end of a cycle, the base plate 36 is mounted to be bodily moved upwardly and held in that position during the stringing operation by the 17" cylinder 38. When the predetermined number of parts have been strung, the cycle ends with the stringing of the last of said predetermined number by number 2 gripper whereupon the base plate 36, with number 2 gripper still grasping the wire, is moved downwardly some 17" awaiting the operation of the retriever to grip the string, snip the upper end thereof and to then transport this string of parts and to wedge it in between two turns of a storage coil. The base plate on which number 1 gripper is mounted is stationary, as indicated.

Each gripper is mounted on an extendible arm, such as the arm 39, the housing 40 of which is pivoted at the point 41. A pneumatic cylinder 42 pivoted at the point 43 acts to first rotate the gripper from its normal position, as indicated in Fig. 17, to its position in cooperative relationship with the stringing wire, as indicated in Fig. 18, and thereafter vertically downward to its position as indicated in Fig. 20.

A limit switch, not shown here, is mounted to be operated during the time the housing 40 is in any one of the positions shown in Figs. 18 to 22 and another switch is mounted to be operated when the arm 39 is in any one of the positions of Figs. 20, 21 and 22. Both limit switches release as the arm 39 and the housing 40 move backward in the manner indicated in Fig. 26.

In each of the Figs. 17 to 27 the stringing wire is shown and a dot and dash circle representing the orbit of the nose of the winder is shown.

It is believed to be clear from this series of sketches that first one and then the other of these grippers moves in, grasps the wire, and pulls it down for the next operation of the winder. When the other gripper then moves in and grasps the wire, the first relaxes its grip and then moves back to its normal position.

At the start of a stringing operation, number 1 gripper has grasped the stringing wire and thus holds the lower end thereof, as indicated in Fig. 23, while the 17" cylinder 38 is raising the number 2 gripper to the position shown in Fig. 17. Thereafter the two grippers operate alternately until some predetermined odd number of pieces has been strung and the retriever has snipped off the wire and deposited the string of parts in the storage reel.

Fig. 28 is a schematic showing of the number 2 gripper and the circuitry provided therefor. The gripper is shown in its operated position after it has reached its mid-travel position where the limit switch LS–1 has been operated and after it has thereafter moved downwardly to its end stroke position where the limit switch LS–2 has become operated. The operation of the limit switch LS–1 when the gripper has reached its mid-travel position is shown to have caused the operation of relay CR–13 which in turn has caused the operation of the "CLOSE NUMBER TWO GRIPPER" solenoid to bring the jaws of this gripper together.

When the number 2 gripper reaches its end stroke position, the limit switch LS–2 is operated and this causes the operation of the relay CR–12 which closes one break in the circuit of the "RETRACT NUMBER TWO GRIPPER" solenoid. However, this solenoid will not be operated until the number 1 gripper in its turn reaches its mid-travel position and causes the operation of its limit switch LS–6 corresponding to the LS–1 switch of this number 2 gripper.

As gripper number 1 goes through its operations and the number 2 gripper is in its normal position, gripper number 1 will reach its end stroke position similar to that shown herein and its end stroke limit switch LS–7 will be operated. This will cause the operation of the relay CR–11 so that when the "CLAMP UP" limit switch LS–3 is operated, the circuit for the "ADVANCE NUMBER TWO GRIPPER" solenoid will be closed and this gripper herein shown will advance first to the position where its limit switch LS–1 is operated and then to its end stroke position where its limit switch LS–2 is operated.

Operation of the retriever

The operation of the retriever shown in Fig. 1 and described in steps 49-A through 60 inclusive may be shortly described as follows. It is triggered by three limit switches, LS–12, LS–8 and LS–9. The limit switch LS–12 operated when the 17" cylinder reaches its extreme down position and when an extra 17 inches of wire at the top of a string of piece parts has been pulled out of the nose of the orbital winder causes the operation of the relay CR–15 and this relay remains operated until LS–12 is released when the 17" cylinder starts its next upward movement. The relay CR–15 closes one circuit for the relay CR–8 and hence this latter relay remains operated under a locking circuit also controlled by normally closed contacts of relay CR–4 which in turn will not open this locking circuit until the 17" cylinder has moved to its extreme up position where the LS–9 switch is operated. It will be noted that the relay CR–30 is one of those relays which must have been operated prior to step 1 and since this CR–30 cannot be released until the relay CR–9 is operated, CR–30 will be found operated when the LS–12 is operated. The operation of CR–9 depends on the coincident operation of CR–10 and CR–6. CR–10 depends on LS–8 so that CR–30 therefore cannot be opened until LS–8 at the end of the retriever advance movement has been completed and CR–6 is only operated when the closure of number 1 gripper has been signaled. Hence the circuit of the advance retriever is maintained until it is certain that the retriever has completely advanced and the number 1 gripper has grasped the stringing wire.

The operation of the relay CR–9 releases the relay CR–30 which, however, is maintained operated a short time by a condenser resistance discharge circuit to provide time for the gripping and snipping of the stringing wire, as follows. When the relay CR–9 is operated, the "CLOSE RETRIEVER" solenoid is energized and this pneumatically operates two air cylinders on the retriever arm, one of which causes the wire to be gripped and then snipped in two about 3" below the point where it is gripped and some 15" below the point where it is now gripped by gripper number 1. Thus some eighteen inches of wire is left dangling from gripper number 1. The other of the said two cylinders on the retriever arm acts to extend the retriever arm by an amount equal to the pitch of the helical coil comprising the storage reel so that when the retriever is released from its operated position and returns to its normal non-operated position, it will carry the upper end of the wire holding a plurality of strung parts into the said reel one loop beyond that where the last one was welded. It will also introduce a blade into the helix one more point along this coil so that when the air pressure is taken off these two cylinders, not only will the grip on the upper part of the string of piece parts be relaxed, but the entire helix will be rotated by an amount equal to the pitch of this storage reel helix.

Upon the operation of CR–10 triggered by LS–8 as above described, a circuit for the 17" cylinder up is closed whereupon this cylinder moves up and carries the number 2 gripper to its operating position. When this is reached, the LS–9 switch is operated and this causes the operation of the relay CR–4 which opens the holding circuit of CR–9 whereupon the relay CR–9 releases and opens the circuit for the "CLOSE RETRIEVER" solenoid whereupon the grip on the stringing wire is relaxed and the storage reel helix is moved one step forward ready for the next operation.

It may be noted at this point that if the string just wedged into the storage reel is the last it could hold that upon this last step of the reel will bring a cam surface provided on the mounting for the storage reel under the plunger for the limit switch LS–13 which will have the same effect as an opening of the cycle stop switch and will thus halt further operations until the full reel can be removed (manually) and be replaced by an empty reel.

Let us now look at Figs. 29 to 34 to follow the above operations in somewhat more detail.

Fig. 29 is a schematic showing of the storage reel 7 and the retriever 8 in its normal position. This arm 8 is mounted to pivot about a pivot pin 44 which in the normal position of the retriever is held at the upper end of an elongated pivot hole in the retriever arm 8 by a tension spring to normally hold the arm 8 closely to the pivot pin 44.

Mounted on the outward end of the retriever arm 8 is a blade 45 which, as indicated in Fig. 30, is wedged in between two of the turns of the helix forming the principal part of the storage reel 7. Fig. 30 also shows the last string indicated by a black dot representing the cross section of a stringing wire wedged between the next counterclockwise turns of this helix. A mechanically operated brake applied to the storage reel (not shown) to prevent the rotation of the reel when the blade 45 has been removed from the position shown in Fig. 30, is released while the retriever is in the position indicated in Figs. 29 and 34 but is effective when the retriever is in the positions indicated in Figs. 31 and 32.

When the retriever is to be operated by the circuitry indicated in Fig. 31, when the 17" cylinder has reached the limit of its downward movement, as hereinbefore described, the limit switch LS–12 is operated resulting in the operation of relay CR–15 and this in turn resulting in the operation of relay CR–8. The relay CR–8 operates the "ADVANCE RETRIEVER" solenoid and this causes the admission of compressed air into the cylinder 46 pivoted at the point 47. The arm 8 rotates in a counterclockwise direction in the positions shown in Figs. 31 and 32. When the position of Fig. 32 is reached, the arm 8 meets a stop 48 and at the same time operates the limit switch LS–8. As indicated in Fig. 32, there are mounted on the retriever arm 8 a pair of pneumatic cylinders 49 and 50, the first for pressing against the pivot 44 to move the arm 8 upwardly thus effectively lengthening the retriever arm and the second for closing the snipper blade and the jaw of the retriever whereby the dangling string of piece parts is gripped and snipped. These two cylinders are both controlled by the "CLOSE RETRIEVER" solenoid which is indicated in Fig. 32 to be controlled by the relay CR–9. This relay is shown to be under the joint control of relays CR–10 and CR–6. Since the relay CR–6 is controlled by CR–11 and this has already responded to the limit switch LS–7, it will be seen that as the arm reaches the stop 48 the resulting operation of the limit switch LS–8 triggers this gripping, snipping and lengthening operation of the retriever arm. By the lengthening of this arm the blade 45 is now positioned so that when the arm is released by the cylinder 46 to return to the position indicated in Fig. 34 it will enter the helix another position clockwise of the helix as indicated in Fig. 33.

It will appear hereinafter that the operation of the relay CR–9 will cause the deenergiation of the relay CR–30 and this will complete a circuit to move the 17" cylinder up which releases LS–12 and eventually operates LS–9. This eventually releases CR–9 so that the advance retriever solenoid is deenergied and the retriever arm returns from the position indicated in Fig. 33 to the position indicated in Fig. 29 during which movement the storage reel is rotated one step in a counterclockwise direction.

Before proceeding with a detailed description of the operation of the device through a description of the wiring diagram, it will be helpful to understand the functions of the limit switches.

The limit switches

The device of the present invention is provided with a plurality of switches known as limit switches, or sometimes known as microswitches, each mounted in such a manner that when a certain element has reached the limit of its movement it will be operated and will thereby trigger a following operation. For the purpose of explanation and to give a clear description of the operation of the device of the present invention, these limit switches may be listed as follows.

LS–1 mid stroke, number 2 gripper

This switch is placed in such a position that when the housing of the support for the number 2 gripper has been rotated toward the wire on which the piece parts are to be strung so that the jaws of th gripper are in cooperative relationship therewith and will grip the wire when closed, this limit switch will be operated. Since the gripper in its cycle of operations moves over a substantially rectangular path, the first and third horiontal legs thereof being somewhat curved and the second and fourth legs are straight line vertical movements, the LS–1 switch is operated at the end of the first (somewhat curved) movement and remains operated during the second downward straight line movement, being released thereafter when the mounting for the gripper is started on its third curved movement. LS–6 is a corresponding limit switch for number 1 gripper.

LS–2 end stroke, number 2 gripper

This switch is placed in a position to operate when the number 2 gripper has completed its first downward straight line movement, that is after the gripper has gripped the wire and by drawing a short length from the nose of the orbital winder has stretched such wire between the gripper and the nose of the winder alongside the piece part so that when the winder is rotated it will wind a loop about the piece part. LS–2 remains operated until the number 1 gripper, in its hand over hand movement, moves in place directly above the number 2 gripper and grips the wire as the number 2 gripper relaxes its grip and begins to move away on the third leg of its movement on the way to resume its normal or starting position.

LS–3 clamp UP

One of the important elements of the present invention is a clamp into which a piece part is thrust, which then closes to firmly grasp such part and which is thereafter moved to an "UP" position to position a given and appropriate part thereof directly onthe axis of the orbital winder so that this in its operation will wrap the wire about such part, once or twice, or twice with an interlocked wrap. In this specific embodiment of the clamp it is pivoted so that the movement from its normal to its UP position is a quarter circle rotary movement. The LS–3 switch is provided to be operated when the clamp has thus been rotated 90° and it will be seen hereinafter that the operation of LS–3 triggers the operation of the orbital winder.

LS–4 winder end stroke

The orbital winder in its rotary movement controls the operation of two limit switches, one at the mid point of its stroke and the other, LS–4, just before the completion of its stroke. This limit switch, transiently operated, releases the relay which controls the closure of the clamp so that as the wrap of the wire is completed, the grasp of the clamp on the piece part is relaxed in turn making it possible for the strung piece part to be moved downwardly as the next gripper grasps the wire above this piece part and moves it downwardly while the clamp now being emptied is rotated back to the position where another piece part may be laid therein.

LS–5 feeder forward

This limit switch is normally closed and is in the circuit of the means provided to move the feeder forward so that when this circuit is closed at some other point it will transport another piece part into the now opened clamp. As it reaches the end of its travel, this limit switch will be operated to open the circuit for impelling the feeder forward and the spring actuated valve will control the pneumatic retraction of the feeder, first retracting the plate to drop the piece part on to the surface of the clamp and immediately thereafter retracting the slide so that the clamp may be closed on the deposited piece part.

LS–6 mid stroke, number 1 gripper

This is a limit switch performing the same function for number 1 gripper that LS-1 performs for number 2 gripper.

LS-7 end stroke, number 1 gripper

This is a limit switch performing the same function for number 1 gripper that LS-2 performs for number 2 gripper.

LS-8 retriever advanced

The last step in a stringing cycle is to pull an extra length of wire from the nose of the orbital winder and then snip it off so that a string of piece parts may be transported to a storage reel. The retriever is an arm which moves over, grasps the top end of the string of parts, snips it and then wedges it in between two coils of the storage reel. The LS-8 limit switch is mounted so as to be operated when the retriever has reached the point where the depending wire is within its jaws and the operation of this switch triggers the gripping and snipping operation and the return of the retriever to its normal position where it wedges the string of piece parts in between two coils of the storage reel and then rotates the storage one step equal to the pitch of the helix.

LS-9 17" cylinder UP

One of the elements of the device is known as the seventeen inch cylinder and is the means by which an extra length of wire is drawn from the nose of the orbital winder after a proper number of piece parts have been strung. Seventeen inches is a convenient length, but is not critical. This cylinder operates to move the base on which the number 2 gripper is mounted, up to the operating position where the number 2 gripper is held during the stringing operations and after the last of a given number of parts has been strung and while the number 2 gripper has a grip on the stringing wire it moves down to pull an extra length of wire from the nose of the orbital winder. LS-9 is a limit switch mounted to operate when the 17" cylinder has reached its upper position.

LS-10 feeder normal

This limit switch is mounted to be operated after the piece part feeder has deposited a piece part on the clamp and has returned to its normal position to allow the clamp to be closed and then rotated to its UP position. LS-10 triggers the operation of the close clamp magnet.

LS-11 clamp closed

This limit switch is mounted to be operated when the clamp becomes closed and by its operation closes a point in the circuit for the clamp up solenoid. Thus, when the clamp moves up, the switch LS-3 above described will be operated to trigger the operation of the orbital winder.

LS-12 17" cylinder down

This limit switch is mounted to be operated when the operation of the seventeen inch cylinder has moved the number 2 gripper downwardly to pull an extra length of wire from the nose of the orbital winder. LS-12 triggers the operation of the retriever.

LS-13 reel full

It has been mentioned hereinabove that the last act of the retriever in its operation is to rotate the storage reel in order to position the next space between two coils thereof for the storage of the next string of parts. The storage reel has a cam surface provided so that when the reel has been rotated step by step until it is full, the LS-13 limit switch will be operated to indicate the completion of the full number of operations of the device. The stringing machine will be shut down until an attendant can remove the full reel and replace it with an empty one.

LS-14 winder—½ stroke

The orbital winder is known as a single revolution clutch means in which the clutch is operated by a magnet. As the revolution of the winder takes place, the magnet controlling the operation thereof is released so that when the nose of the winder completes its revolution it will be brought to a halt. LS-14 is a limit switch mounted to be transiently operated as the winder reaches its half stroke position and by its momentary operation triggers the operation of a relay for opening the circuit of the clutch magnet.

Legend

The legend is a group of symbols used in the wiring diagrams. It includes the conventional showing of an on and off switch and the conventional push button switches both normally open and normally closed. The relays, both those which respond to alternating current energization and those which respond to direct current energization are represented by a circle enclosing the designation CR (for control relay) and a specific numeral. The relay contacts are shown as a pair of vertical contiguous lines, the normally open contacts being plain and the normally closed contacts having an inclined stroke drawn across them. A solenoid is represented by a large Z with a vertical stroke drawn therethrough. Most of these solenoids operate air valves, such as that labelled on the wiring diagram Fig. 39 as the Main Switch and which is arranged to be operated so long as power is supplied to the network in order to supply compressed air to the pneumatic system. Most of these solenoid operated air valves are of simple on and off construction and serve to admit air to piston cylinders only while operated. Others, such as the advance feed solenoid and the shuttle solenoid, operate spring returned air valves which admit air to the forward stroke chamber of a piston cylinder when operated and to the return stroke chamber when normal or deenergized. An electromagnet, such as the winder clutch magnet, which when energized operates the winder latch to allow the single revolution clutch to operate is shown as a large Z without the vertical stroke. The limit switch, both that which has a normally open contact and that which has a normally closed contact is shown as an ordinary on and off switch with a narrow triangle appended thereto (which represents the cam protruding from the side of the switch and through which it is operated). These limit switches or, as they are sometimes known, microswitches are of various designs and may be variously shown, as in Figs. 29, 31, 32 and 34, the limit switch LS-8 is shown as a cartridge having a push button protruding therefrom whereas the same switch is shown in the wiring diagram Fig. 43 by the symbol in this legend. A plug and jack connector is a conventional device for rearranging the circuitry for various purposes and is particularly useful herein where circuit rearrangements must be made when the stringing machine device is moved from one parts feeder to another and is shown herein as a pair of cooperatively arranged arrow heads. The fixed condensers and the adjustable condensers are shown conventionally.

Preparation for operation

To prepare the device for operation certain manual switches must be operated.

First, the motor switch must be moved to its ON position so that the winder motor is connected to the power supply conductors which, when energized, will place the motor into operation.

Second, the auto-hand switch must be in "hand" position so that the HR relay will remain unoperated until the various machine elements may be adjusted.

Third, the "close clamp" switch is left open.

Fourth, the "cycle stop" switch, forming one link in the close clamp solenoid circuit is open.

Fifth, the "clamp up-down" switch, like other three position switches is spring loaded to automatically return to center position when finger pressure is removed.

The clamp up-down switch is normal, that is, neither the "clamp-up" nor the "clamp-down" solenoid is operated at this time.

Sixth, the close retriver switch is open.

Seventh, the number 2 gripper in-out switch is in center.

Eighth, the number 2 gripper close switch is open.

Ninth, the number 1 gripper close switch is open.

Tenth, the number 1 gripper in-out switch is in center.

Eleventh, the advance retriever switch is open.

Twelfth, the 17" cylinder up-down switch is in center.

Thirteenth, the "Feed In-Out" switch is open.

Fourteenth, the "shuttle" switch is open.

Fifteenth, the "Two Turns" switch is in "one" position, and

Sixteenth, the 5 position selector switch is resting on its contact 9.

The machine is started by the momentary operation of the "Power On" button through which the Power Relay is caused to operate and this relay closes its contacts to connect power to the network and to maintain itself in operation through the normally closed "stop" button. Power indicator goes on at this time.

The appropriate hand switches must now be operated to bring the machine elements into the positions listed below:

(1) 17" cylinder is up and LS-9 is actuated.
(2) Gripper number 1 forward and down, LS-7 is actuated.
(3) Gripper number 2 back and up.
(4) Gripper number 1 is open.
(5) Gripper number 2 is open.
(6) Clamp open.
(7) Clamp down.
(8) Clamp shuttle is out.
(9) Retriever jaws are open.
(10) Retriever is back.
(11) Retriever is retracted.
(12) Reel brake is off.
(13) Magazine feeder slide is back.
(14) LS-13 is actuated (reel is assumed to be not full).
(15) Magazine feeder plate is back.

As the power is switched on, the main valve solenoid is operated so that compressed air becomes available.

The operator must bend the wire coming from the nose of the winder so that it is between the open jaws of the numbere 1 gripper.

The auto hand switch is moved to "auto" position and the auto indicator will light. The HR relay opens a power supply line whereby certain machine movements may be caused by manual operation of certain of the switches on the control panel and closes an alternate power supply line whereby automatic control may be placed into operation.

Immediately relays CR-30, CR-11 and CR-4 become operated as conditions necessary for their operation were already set up prior to the application of power by the HR relay.

The auto push button switch in the circuit of close number 1 gripper is momentarily depressed, thus closing number 1 gripper on the wire and operating CR-6. CR-6 contacts close a holding circuit to hold both the close number 1 gripper and the relay CR-6 until CR-3 operates later.

The autoclose clamp push button, momentarily depressed, energizes the close clamp solenoid valve and also causes the operation of CR-1, which closes a locking circuit until CR-2 operates later.

Assuming that the magazine feeder in which the piece parts are stacked is being used, it may be noted that the machine elements and limit switches are in the following condtion:

(1) The 17" cylinder is up and the LS-9 is actuated.
(2) Gripper number 1 is forward and down whereby LS-7 is actuated.
(3) Gripper number 2 is back and up.
(4) The jaws of gripper number 1 are closed and therefore holding the wire stretched from the nose of the orbital winder to a point below the part of the piece part about which the wire is about to be wound.
(5) The jaws of gripper number 2 are open.
(6) The clamp is closed on a part providing such a part had been placed there prior to switching to "auto" and LS-11 is actuated.
(7) The clamp is down.
(8) The clamp shuttle is out.
(9) The winder is latched.
(10) The retriever jaws are open.
(11) The retriever is back.
(12) The retriever is retracted.
(13) The reel brake is off.
(14) The magazine feeder slide is back.
(15) LS-13 is actuated (reel assumed to be not full).
(16) The magazine feeder plate is back.

*Operation*

At this point the cycle will begin as the cycle stop switch is moved to its closed position. The cycle detailed as a series of steps is as follows:

(1) The "Clamp Up" solenoid is energized through the normally closed LS-13 (which only becomes open when the reel is full), the LS-11 now closed since the clamp is closed, CR-11 which is normally closed as above described and CR-4 which is also normally closed as above described.

(2) As the clamp moves upward, the firmly grasped piece part is carried into physical contact with the wire and into cooperative relationship with the orbital winder. When this motion is completed the LS-3 is operated.

(3) The operation of LS-3 closes a circuit for the CR-5 relay.

(4) the resulting operation of CR-5 closes a circuit through the now closed contacts of CR-6 to energize the CR-21 relay.

(5) The CR-21 relay closes a circuit through the now close contacts of the CR-1 to energize the "wind clutch magnet" (it may be noted at this point that if the device had been adjusted to perform a crossed over double wind the shuttle switch would have been closed and the shuttle solenoid would also operate in parallel with the wind clutch magnet).

(6) The winder now revolves and at its half stroke operates LS-14.

(7) LS-14 closes a circuit through the now closed contacts of CR-5 to cause the energization of CR-20. CR-20 locks into operation.

(8) CR-20 opens the circuit of CR-21 and this latter relay releases.

(9) The release of CR-21 opens the circuit of the "wind clutch magnet."

(10) As the winder approaches its latch up position, LS-4 is pulsed, that is, it is operated momentarily.

(11) LS-4 closes a circuit through the now closed contacts of CR-21 to energize the "pick" winding of CR-2 whereby this relay becomes energized. As this relay moves its armatures it opens the normal charging circuit for a 200 mf. condenser and closes a discharging circuit therefor through its hold winding whereby the momentary operation of the CR-2 relay is prolonged to provide sufficient time for the following movement of the clamp.

(12) The CR-2 relay opens the circuit for the "Close Clamp" solenoid and the CR-1 relay and at the same time closes a circuit for the "Clamp Down" solenoid.

(13) As the clamp comes down, LS-3 is de-actuated, CR-5 releases and both CR-19 and CR-16 are operated.

It may be noted that during the operation of CR-5 the direct circuits for each of these relays was held open and a charging circuit for an associated condenser was closed. Now, as CR-5 releases, the charged condenser is taken out of its charging circuit and connected to discharge through the winding of CR-16 in one case and CR-19 in the other. CR-19 merely operates momentarily whereas CR-16 locks through the LS-5. The momentary operation of these two relays, CR-19 and CR-16, is of sufficient duration for completing the following operations which they trigger simultaneously and which result in the two sets of motions, one described under the following items 14, 15, 16, 17 and 18, and the other described under the following items 14A, 15A, 16A, 17A, 18A and 19A.

(14) CR-11 which is now held operated by LS-7 (end of stroke by number 1 gripper) in combination with CR-19 during its momentary operation energizes the number 2 gripper advance solenoid. The period of operation of CR-19 is sufficiently long to shift this air valve. It may be noted that the advance number 2 gripper and the retract number 2 gripper solenoids both operate the same valve, one moving it in one direction and the other in the opposite direction. A pulse is sufficient to cause the valve to shift to one position or the other depending on which solenoid was pulsed. The valves controlling the advance and retract number 1 gripper, clamp up-down, and 17″ cylinder up-down are of the same construction.

(15) Number 2 gripper swings through its forward arc and operates the LS-1 switch.

(16) LS-1 causes CR-13 to pulse by the discharge of the 100 mf. condenser held in a charging circuit during the non-operated period of LS-1. Relay CR-13 only remains operated during the discharge of the said 100 mf. condenser but during this period it closes the circuit for the "Close number 2 Gripper" solenoid and in parallel therewith the relay CR-3. It may also be noted that CR-13 closes a circuit in parallel with LS-1 to overcome chatter of the contacts of this limit switch, but since LS-1 remains operated long after CR-13 has released, this parallel connection is opened first and the reoperation of CR-13 on the release of LS-1 is avoided. The number 2 gripper now closes on the wire. The operation of CR-13 closes a circuit for CR-25 for a short period and this in turn closes a circuit for CR-40. This relay locks and by its operation indicates a count of 1.

(17) The CR-3 relay opens the "Close number 1 Gripper" circuit and combined with the now operated contacts of CR-4 and CR-11 closes a circuit for the "Retract number 1 Gripper" solenoid.

(18) Through the operation of the CR-3 relay and the release of CR-6, a circuit for the continued energization of CR-3 is established so that the now closed number 2 gripper completes its stroke by moving the gripper down, thus pulling out 1½″ of wire. At this end of the stroke of number 2 gripper, the LS-2 is operated and this causes the operation of CR-12.

As hereinbefore stated, during the performance of these movements described under these items 14 to 18 and starting with the operation of CR-19, another series of operations starting with the operation of CR-16 are taking place, as follows:

(14A) The operation of CR-16 closes the circuit for the "Advance Feed" solenoid.

(15A) The feed slide and plate advance together carrying a part into the clamp and actuating LS-5.

(16A) LS-5 opens the holding circuit for CR-16 and thus releases this latter relay and this in turn opens the circuit for the Advance Feed solenoid. This advance feed solenoid operates a spring return air valve which, when deenergized, cuts off the supply of air to the two cylinders for the feeder and admits air to the return chambers thereof.

(17A) The plate retracts first, thus dropping the part in position on the clamp pad.

(18A) Thereafter the slide retracts, pulsing LS-10. The sequencing of the plate and slide motions is done pneumatically.

(19A) LS-10 in combination with the normally closed contacts of CR-2 operates the "Close Clamp" solenoid in parallel with CR-1 whose contact substitutes a circuit for LS-10. The clamp grips the part and the LS-11 is operated.

(20) The combination of CR-12 at the end of the movements 14 to 18 inclusive and the LS-11 at the end of movements 14A to 19A inclusive, energize the "Clamp Up" solenoid. It will be noted that CR-4 and CR-40 are operated at this time. The movement of the clamp to its UP position results in the operation of LS-3 (see movement 2).

(21–31) These eleven steps are a repetition of steps 3 to 13 after which the following steps 32 to 36 corresponding to steps 14 to 18 inclusive are performed simultaneously with steps 32A to 37A corresponding exactly to steps 14A to 19A inclusive. Steps 32 to 36 inclusive detail the movement of the number 1 gripper instead of the number 2 gripper, thus describing the hand over hand operation of the two grippers.

(32) CR-19 coupled with CR-12 (instead of CR-11 as in item 14) closes a circuit through the now closed contacts of CR-60 and CR-6 to operate the "Advance number 1 Gripper" solenoid.

(33) The number 1 gripper swings through an arc and actuates LS-6.

(34) LS-6 causes CR-14 to pulse thus closing the circuit for the "Close number 1 Gripper" solenoid and in parallel therewith CR-6. The number 1 gripper closes on the wire and the CR-6 relay operates and locks in.

(35) CR-6 opens the "Close number 2 Gripper" circuit and closes a circuit through the now closed contacts of CR-60, CR-12 and CR-15 to energize the "Retract number 2 Gripper" solenoid.

(36) The number 1 gripper completes its stroke by moving the gripper down thus pulling out 1½″ of wire and operating LS-7 which complete a circuit for CR-11.

At the end of movement 37A which is the same as 19A, the LS-11 is operated and hence now that CR-11 and LS-11 are simultaneously operated the conditions of step 20 are obtained. Hence, step 38 is the same as step 20, with the exception that CR-12 is energized in step 20 whereas CR-11 is energized in step 38.

(39) This is the same as step 2. The cycle continues by repeating steps 2 to 39 until the ninth piece part (or whatever other number has been pre-selected on the rotary selecting switch) has been wound and step 16 thereafter has been reached. Starting with step 16, the cycle is completed as follows:

(40) LS-1 causes CR-13 to pulse thus closing number 2 gripper on the wire and operating CR-3. The CR-13 relay controls a latch consisting of the CR-25, the CR-L, the CR-UL and the CR-24 relays. Upon the first operation of the CR-13 relay, the CR-25 relay will respond and close a circuit for CR-L which will mechanically latch in to an operated position and make circuit changes whereby a second or even numbered operation of CR-13 will cause the operation of CR-24 resulting now in the closure of a circuit for the CR-UL coil. This is an unlatch coil in the same relay as coil CR-L which releases the latch of the relay. Therefore, after each odd numbered operation of CR-13, the CR-L relay will be found latched in and the circuit for CR-24 will be prepared whereas after each even numbered operation of CR-13 the CR-UL will unlatch the relay and the circuit for CR-25 prepared for operation. It may be noted that this latching upon the first operation of CR-13 will result in the operation of CR-40, the second operation of CR-13 will result in the operation of CR-41 and so on. Since the operation of CR-13 represents an odd numbered wire wrapping event, the number of piece parts that are strung may be 1, 3, 5, 7 or 9 and since it has been assumed that the selector switch is on the point designated 9, no circuit will be closed through the selector switch for CR–60 until the relay CR–44 is operated. Thus, upon the fifth operation of CR–13, relay CR–44 will be operated.

(41) The operation of CR–44 results in the operation of CR–60.

(42) CR–3 opens the "Close number 1 Gripper" solenoid and, combined with CR–11, energizes the "Retract number 1 gripper" circuit.

(43) Number 2 gripper completes its stroke by moving down, thus pulling out 1½" of wire and operating LS–2 which thereupon closes a circuit for CR–12.

(44) The operation of CR–12 would ordinarily have closed a circuit for the "Clamp Up" solenoid, but since CR–60 is now operated this is prevented and hence the normal cycle is interrupted.

(45) CR–12 combined with CR–60 energizes the 17" cylinder down solenoid causing the entire number 2 gripper assembly to move down (still gripping the wire) thus pulling out about 17" of wire and releasing LS–9, in turn releasing CR–4.

(46) At the end of this downward 17" stroke, the LS–12 is actuated and this closes a circuit to operate CR–15.

(47) CR–15, in operating, closes a circuit for CR–8 which then locks under control of CR–4 and LS–9 so that CR–8 will remain operated until the 17" cylinder is again moved up. Upon the operation of CR–8 two series of steps will take place simultaneously, steps 49 to 55 resulting in the operation of CR–6 and steps 49A to 51A resulting in the operation of CR–10. These steps are as follows:

(48) The operation of CR–8 causes a momentary operation of CR–18 through the discharge of a 100 mf. condenser.

(49) CR–18 coupled with the now operated CR–60 operates the "Advance number 1 Gripper" solenoid.

(50) Gripper number 1 swings through an arc and operates LS–6.

(51) LS–6 pulses CR–14 but since CR–8 is operated at this time, the operation of CR–14 is without effect in the circuit of "Close Number 1 Gripper" and CR–6.

(52) Gripper number 1 completes its stroke without touching the wire and at the end of the downward movement thereof actuates LS–7.

(53) LS–7 closes the circuit for CR–11.

(54) CR–11 now closes a circuit about the now opened contacts of CR–8 whereby the "Close Number 1 Gripper" solenoid and CR–6 are energized. While these movements resulting in the final operation of CR–6 are taking place, the following movements are simultaneously being carried out:

(48A) CR–8 along with the normally operated CR–30 closes the "Advance retriever" solenoid circuit.

(49A) The retriever moves forward, releasing the mechanically operated air valve which applies the brake holding the storage reel in position. The wire is now between the retriever jaws.

(50A) LS–8 operated by the advance of the retriever closes a circuit for CR–10.

(55) As CR–10 and CR–6 both become operated, a circuit is closed for CR–9 which then locks into operation under control of the CR–4 in its normal condition.

(56) CR–9 energizes the "Close Retriever" solenoid circuit. This cuts the wire, and grips it at the top of the completed string and at the same time extends the retriever arm about 3/32".

(57) CR–9 resets the counter circuit thus releasing CR–40, CR–41, CR–42, CR–43, CR–44 and CR–60. The circuit of CR30 is opened but its release is delayed by the discharge of its associated 100 mf. condenser.

(58) The release of CR–60 opens the number 2 gripper by opening the circuit for the "Close number 2 Gripper" solenoid and the CR–3 relay.

(59) In time, the release of CR–30 opens the "Advance Retriever" solenoid circuit and causes the retriever to retract thus wedging the wire between two coils of the storage reel and engaging the reel with a blade protruding from the bottom of the retriever jaw. The retriever presses the mechanically operated air valve which releases the reel brake. The release of CR–30 also completes the circuit through the now closed CR–3 contacts and the CR–10 contacts closed until the retriever has actually moved back and released the LS–8 contacts, to cause the operation of the 17" cylinder up solenoid.

(60) As the 17" cylinder starts raising the number 2 gripper assembly, LS–12 is released and thus CR–15 is released.

(61) With CR–60 released, CR–6 and CR–12 now operated the release of CR–15 closes the circuit for the "Retract Number 2 Gripper" solenoid.

(62) The 17" cylinder completes its upward stroke thus actuating LS–9.

(63) LS–9 closes the circuit for CR–4.

(64) The operation of CR–4 opens the circuit for CR–9, which in turn de-energizes the "Close Retriever" solenoid circuit, opening the jaws and retracting the arm causing the storage reel to index one coil. This completes the cycle. Unless stopped, this movement will be immediately followed by step 1 and the cycle will be repeated.

*Two turns*

When it is required that the orbital winder is to make a double wrap, then the following changes in the cycle are made. The switch for controlling the CR–23 relay left open hereinbefore is now closed whereby CR–23 is operated normally and a 200 mf. condenser will be present in a charging circuit as long as CR–21 is released. When this latter relay is operated then the 200 mf. condenser will be discharged through CR–23 and this relay will be delayed in releasing.

Steps 5 to 7 inclusive and the repetition of these as steps 24 to 26 inclusive from the operation of CR–21 to the operation of CR–20 are now replaced by the following seven steps:

(1) CR–21 operates the "wind clutch magnet" and starts the delayed release of CR–23.

(2) The orbital winder revolves and on the half stroke of the winding arm the LS–14 is operated.

(3) Since the release of CR–23 is delayed, LS–14 is ineffective in the circuit for CR–20.

(4) As the winder nears completion of the first revolution, LS–4 operates momentarily.

(5) LS–4 is unable to operate CR–2 since CR–21 is still operated. Since CR–2 remains unoperated, CR–1 remains operated and hence the "Wind Clutch Magnet" remains in operation.

(6) The winder continues to revolve, again pulsing LS–14.

(7) CR–23 has had sufficient time to release, whereby on this second operation of LS–14 the circuit for CR–20 will be closed and this relay will operate and lock under control of CR–5.

If it is desired to produce a crossed over wrap along with a double wrap, then the shuttle switch which places the shuttle solenoid in parallel with the wind clutch magnet must be closed when the device is being adjusted for operation. Additionally step 1 of these substitute steps for the double wrap also contains the following information; CR–21 also energizes the "shuttle" solenoid causing the clamp to move toward the winder during winding thus crossing the second wrap over the first.

Step 9, hereinbefore set forth, has the following additional information: The "shuttle" circuit is opened in this step thus moving the clamp away from the winder to its original position.

*Magnetic feeder*

If it is desired to use the magnetic feeder 10 in place of the magazine feeder 11, the following changes in the description must be made. In the wiring diagram certain circuits individual to the magazine feeder are disconnected by pulling out the "F" connectors and others individual to the magnetic feeder substituted therefor.

The device thus introduced into the circuit includes a vibratory parts feeder, a conventional means for vibrating a mass of piece parts (by 60 cycle current) and which orients the piece parts and urges them into a chute from which they may be fed to the clamp, one at a time. The vibratory parts feeder, in one form kown commercially as a "syntron," is controlled by a proximity relay, another conventional device which determines when the chute is full, at which time the vibratory magnet circuit is opened. This same proximity switch automatically restores power to the syntron as the parts are used thus keeping the chute full.

The chute is capable of holding enough parts for about one minute of operation. If a jam should occur or the parts supply be exhausted and the syntron runs continually for more than about one minute, a time delay employing the 2D21 tube will stop the stringing machine until the chute again fills. This time delay is reset every time the syntron stops.

The following changes in the cycle occur when using the magnetic feeder in place of the magazine feeder. Substitute the following five steps in place of the origially stated five steps 14A to 18A inclusive.

(1) CR-16 now closes a circuit through closed contacts of the TD relay for the advance feed solenoid and the CR-X relay. The CR-X relay maintains this circuit closed under control of CR-16 regardless of the possible operation of the TD relay. CR-16 also closes a circuit for the CR-A relay and this relay is prevented from being dropped by opening of TD contacts by means of a set of CR-16 contacts.

(2) CR-A energizes the magnet of the magnetic feeder, thus lifting the part from the chute and holding it against the magnet head.

(3) The magnet carries the part into the clamp and actuates LS-5.

(4) LS-5 opens the circuit for CR-16 which thereby releases both CR-X and CR-A and opens the "Advance Feed" solenoid circuit.

(5) The release of CR-A de-energizes the magnet thus depositing the part on the clamp pad whereupon the magnet retracts and operates LS-10.

By switching the CY.STOP switch to open position, the machine will continue to operate until the beginning of the next string. Since the counter is reset, releasing CR-40, step 1 cannot occur until the CY.STOP switch is returned to closed position.

The normal procedure for shutting the machine off is as follows:

(1) Open the CY.STOP switch and wait for the machine to complete its cycle.
(2) Turn AUTO-HAND switch to HAND.
(3) Push STOP button.

To restart the machine, the following procedure is used:

(1) POWER ON button is momentarily depressed.
(2) AUTO-HAND switch is turned to AUTO.
(3) AUTO switch in circuit of "Close Number 1 Gripper" is momentarily depressed thus closing number 1 gripper on the wire. This also energizes CR-6 which locks in to cause the grip on the wire by number 1 gripper to be maintained.
(4) The AUTO switch in the circuit of "Close Clamp" and CR-1 is momentarily depressed whereby CR-1 locks in and maintains this circuit after the AUTO switch is released.
(5) The CY.STOP switch in the circuit of the "Clamp Up" solenoid is closed and the cycle begins.

What is claimed is:

1. In a machine for stringing a plurality of piece parts, a supply of wire means for repeatedly winding said wire at equally distant points along the length of said wire about a given part of each of a plurality of said piece parts comprising means for successively feeding said piece parts to a stringing station, means for clamping each piece part with its said given part in a given spatial position in cooperative relationship with a wire winding means at said station, means for tautening said wire in close proximity to said given part of said clamped piece part, said winding means consisting of an orbital winder terminating in a nose driven over a circular path and having said wire threaded therethrough, means for gripping said wire below said given part of said piece part for tautening said wire from the said nose of said winder to the said gripper, means for driving the said nose of said orbital winder through its said circular path for winding said gripped wire about said given part, means for thereafter releasing said clamped part to allow movement thereof from said given spatial position, and a second means for thereafter gripping said wire at a point above said given part of said piece part and for releasing said gripping means and for moving said second gripping means to said point below said given part of said piece part whereby another length of wire is extracted from the said nose of said orbital winder and positioned in cooperative relationship with a said given part of a said clamped piece part ready for a succeeding winding operation.

2. In a machine as claimed in claim 1, a plurality of stations each consisting of a said means for successively feeding said piece parts to a stringing station, and means to move said winding means to said different stations.

3. In a machine as claimed in claim 1, means for driving said orbital winder through a plurality of revolutions to wind a corresponding plurality of loops of said wire about said given part of said clamped piece part.

4. In a machine as claimed in claim 1, means for moving said clamped piece part in a line corresponding to the axis of revolution of said orbital winder during the said revolution of said orbital winder to cause said wire wound about said given part of said piece part to cross over an initial winding loop.

5. In a machine as claimed in claim 1, means for driving said orbital winder through a plurality of revolutions and means for simultaneously moving said clamped piece part along a line corresponding to the axis of revolution of said orbital winder to produce a crossed over plurality of loops of wire about said given part of said piece part.

6. In a machine as claimed in claim 1, a control means for determining the number of said winding operations to be performed by said orbital winder and means controlled thereby for extracting a comparatively long length of wire from said nose of said winder and for thereafter severing said wire to produce a string of piece parts.

7. In a machine as claimed in claim 1, a first gripper for gripping the said wire below the said nose of said orbital winder, means for thereupon moving said gripper downwardly to tauten said wire between said gripper and said nose of sad orbital winder past and in close proximity to said given part of a said clamped piece part for gripping said wire during a following revolution of said orbital winder.

8. In a machine as claimed in claim 1, a pair of grippers for alternate operation, each said gripper being controlled to grip the said wire below the said nose of said orbital winder, means for thereupon moving said gripper downwardly to tauten said wire between said gripper and said nose of said orbital winder past and in close proximity to said given part of a said clamped piece part for gripping said wire during a following revolution of said orbital winder and means for thereupon moving a second of said grippers to grip said wire as above set forth while releasing the grip of a first of said grippers on said wire.

9. In a machine as claimed in claim 1, means for controlling said machine through a given number of cycles of operation each consisting of the alternate operation of two grippers, said two grippers each one thereof being controlled to grip the said wire below the said nose of said orbital winder and above the said given part of a said clamped piece part, being further controlled to move downwardly to tauten said wire from the said nose of said orbital winder past and in close proximity to said given part of said clamped piece part, being further controlled to hold said wire so gripped during an operation of said orbital winder until after the other of said grippers has been controlled to grip said wire, being further controlled to thereupon release its grip upon said wire and to then move into position ready for the performance of its function in a succeeding cycle of operations.

10. In a machine as claimed in the next preceding claim, in which means is provided for snipping said wire after a given number of said cycles of operation and for disposing of the resulting string of piece parts.

11. In a machine as claimed in the next preceding claim, a storage wheel consisting of a toroidal helix of wire and means for jamming the snipped end of a said wire into said helix between two turns thereof to dispose of said string of piece parts.

12. In a machine as claimed in claim 1, in which a means for automatically clamping a said piece part is provided said means being controlled to hold a said piece part during the said winding operation and to then release said clamp to allow a strung piece part to be moved when said wire is advanced by a said gripper, means being provided to thereupon move another piece part into said clamp for a following winding operation.

13. In a machine as claimed in claim 1 in which movement of the said grippers is produced by compressed air means, controlled by solenoid operated air valves, in turn controlled by relays in a control network and which said relays are controlled by limit switches mounted on component parts in positions arranged for operation upon the reaching of a limit in the movement thereof and in which said orbital winder is controlled by a similar chain of limit switches, relays and a magnet, said magnet being arranged to couple said orbital winder to a constantly operating shaft for the period of a single revolution of said orbital winder for each said operation of said magnet.

14. In a machine as claimed in the next preceding claim in which a switchboard is provided having mounted thereon a plurality of manually operated switches for separately operating the various components of the said machine, switch means for preparing the said machine for automatic operation in various patterns, a start switch for starting the machine into automatic operation and a stop switch for bringing the operation thereof to a halt.

15. A machine as claimed in the next preceding claim in which said network of relays and limit switches includes means individual to each different part feeder and a jack and plug arrangement for switching the said individual part feeder circuitry into the circuitry of the said stringing head for cooperative relationship with said switchboard and the operating components of said stringing head.

16. A machine as claimed in claim 1, a retriever for seizing the said wire at an extended length above the last of a predetermined number of said strung parts, having means for shearing said wire and having means for transporting said severed string of parts to a storage means.

17. A machine as claimed in claim 1, having a storage reel comprising a circular helix of wire for holding a plurality of strings of piece parts each wedged between two coils of said helix, and having a retriever consisting of a gripper and a shearing means mounted on the end of a rotatable arm, means for rotating said arm to a position where said gripper and said shearing means come into cooperative relationship with said wire, means for operating said gripper and said shearing means and means for thereafter rotating said arm back to its normal position for wedging said gripped wire into said storage reel.

18. A machine as claimed in claim 1, having a storage reel comprising a circular helix of wire for holding a plurality of strings of piece parts each wedged between two coils of said helix, a retriever consisting of a gripper and a wire shear mounted on the end of a rotatable arm, means for rotating said arm and for giving it a small longitudinal movement for effectively lengthening it by an amount equal to the pitch of said helix for moving said gripper and said wire shear into cooperative relationship with said wire, means for operating said gripper and said shear, means for thereafter rotating said arm back toward its normal position for wedging said gripped wire into said storage reel, a blade mounted on the end of said retriever arm in a position also to be wedged between two coils of said helix on said last movement of said arm and means for thereafter releasing said arm from its said lengthened position to rotate said circular helix by an amount equal to the pitch of said helix.

19. A machine as claimed in claim 1, having a counting means for counting a predetermined number of parts strung on said wire, means responsive to the termination of the operations for stringing the last of said predetermined number on a said wire for extracting an extra long piece of wire from the nose of said orbital winder, a storage reel manually detachable from said reel for transporting a plurality of strung parts to another location for further processing consisting of a circular helix of wire for holding a plurality of strings of piece parts each wedged between two coils of said helix, a retriever consisting of a gripper and a wire shear mounted on the end of a rotatable arm, means for rotating said arm and for giving it a longitudinal movement for effectively lengthening it by an amount equal to the pitch of said helix for moving said gripper and said wire shear into cooperative relationship with said extra long end of said wire, means for operating said gripper and said wire shear to appropriate said string of parts, means for thereupon returning said arm to its normal position for transporting said appropriated string of parts to and for wedging said string into said helix between two coils thereof, a blade mounted on the end of said retriever arm in a position to also be wedged between two coils of said helix on said last movement of said arm and means for thereafter releasing said arm from its said lengthened position to rotate said circular helix by an amount equal to the pitch of said helix.

References Cited in the file of this patent

UNITED STATES PATENTS

| | | |
|---|---|---|
| 2,307,219 | Harvey | Jan. 5, 1943 |
| 2,855,159 | Mallina | Nov. 29, 1954 |
| 2,724,415 | Orth | Nov. 22, 1955 |